(12) United States Patent
Lin et al.

(10) Patent No.: US 7,505,606 B2
(45) Date of Patent: Mar. 17, 2009

(54) DETECTING DOCTORED IMAGES USING CAMERA RESPONSE NORMALITY AND CONSISTENCY

(75) Inventors: Zhouchen Lin, Beijing (CN); Rongrong Wang, Beijing (CN); Xiaoou Tang, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 11/132,865

(22) Filed: May 19, 2005

(65) Prior Publication Data

US 2006/0262973 A1    Nov. 23, 2006

(51) Int. Cl.
*G06K 9/00* (2006.01)
(52) U.S. Cl. .................. 382/100; 382/162; 382/167
(58) Field of Classification Search .......... 382/100, 382/162, 167
See application file for complete search history.

(56) References Cited

U.S. PATENT DOCUMENTS 7,450,754 B2 * 11/2008 Lin et al. ............ 382/167

OTHER PUBLICATIONS

Lin, Stephen, et al., Radiometric Calibration from a Single Image, Proceedings of the 2004 IEEE Computer Society Conference on Computer Vision and Pattern Recognition, 2004.
Burges, Christopher J.C., A Tutorial on Support Vector Machines for Pattern Recognition, Data Mining and Knowledge Discovery, 1988, p. 121-167.
Popescu, Alin C., et al., Statistical Tools for Digital Forensics, Department of Computer Science at Dartmouth College.

* cited by examiner

*Primary Examiner*—Tom Y Lu
(74) *Attorney, Agent, or Firm*—Perkins Coie LLP

(57) ABSTRACT

Embodiments of the invention determine whether an image has been altered. Sets of patches are selected in the image, and corresponding inverse response functions are provided to a support vector machine (SVM). The support vector machine is trained with exemplary normal and abnormal inverse response functions. Once trained, the support vector machine analyzes inverse response functions corresponding to a suspected image. The support vector machine determines if the inverse response functions are normal or abnormal by analyzing a set of features. In one embodiment, features include measures for monotonic characteristics, fluctuation characteristics, and divergence characteristics of the red, green, and blue components of a tuple. Each tuple of inverse response functions is associated with a set of patches selected in the image.

20 Claims, 28 Drawing Sheets

400

DETECTING DOCTORED IMAGES USING CAMERA RESPONSE NORMALITY AND CONSISTENCY

TECHNICAL FIELD

The present invention relates to determining whether an image has been synthesized.

More particularly, the present invention relates to determining if the inverse response functions are normal and are consistent.

BACKGROUND

Numerous image/video editing techniques are currently available so that realistic synthetic images/videos can be produced that appear to be realistic to a person. With skillful human interaction, many synthesized images/videos are difficult in being distinguished from real ones even by close visual examination. While greatly enriching user experience and reducing production cost, synthetic images/videos that appear to be realistic may also have adverse consequences. In assessing the validity of an image, one must determine if the image reflects a real situation and correct information. A photograph may be doctored to be misleading. One example is the "B. Walski event." During the Iraq war, various newspapers took liberties that conflicted with reality. On Apr. 1, 2003, for example, the front page of the *Los Angeles Times* featured an image by photographer Brian Walski of a British soldier and Iraqi civilians outside Basra. (The Editorial Eye, Vol. 26, No. 8, August 2003.) The photo also appeared prominently in the *Chicago Tribune,* the *Hartford Courant,* and many other papers. The photo was identified as a fake by an alert *Hartford Courant* reader who noted a curious pattern of repetition in the crowd.

At first glance, watermarking may appear to be a solution for preventing doctored images. However, it is not a complete solution. First, doctored image/video detection is different from digital rights management, which is the intended objective of watermarking. The former aims at determining whether an image/video is real or not, where every image component may belong to the same owner. However, the latter aims at determining whether an image/video belongs to an owner, even though the image/video may be synthesized. Second, as commodity digital/video cameras do not supply the functionality of injecting watermarks as soon as the images/videos are captured, people may find it inconvenient to protect their photos by injecting watermarks on computers. Consequently, there are a very large number of images/videos without watermarks. Third, it is uncertain whether watermark can sustain heavy editing that is beyond simple copy/paste.

Another approach in the prior art is to test the statistics of an images. For example, the approach may test the interpolation relationship among nearby pixels. This approach may include checking the Color Filter Array (CFA) interpolation relationship among the nearby pixels. The approach may be effective in some aspects but is by no means always reliable or provide a complete solution. For example, the resampling test fails when the two images are not resampled or are resampled with the same scale. The double quantization effect does not happen if component images are similarly compressed. Blind gamma estimation and the signal to noise (SNR) test may fail when the component images come from the same camera or the kurtoses of the noiseless image and noise are not known a priori. And the CFA checking may require the a priori knowledge of de-mosaicing algorithm of the camera.

Although the blind gamma estimation method may also recover the gamma of the response function, typical camera response functions do not exactly follow a gamma curve. As a result, the estimated gamma may vary significantly on different parts of the image even when the image is original, making the detection unreliable. Moreover, the blind gamma estimation method tests regions of an image so that the Fourier transform can be applied. Also, in principle, the blind gamma estimation should compute the 4D bicoherence in order to detect the tampering on 2D images. Such computation is formidable. As a result, prior art may resort to row-wise (or column-wise) gamma estimation that only requires 2D bicoherence. Therefore, if the tampered region is surrounded by original regions, the tampering may not be detected. Unfortunately, this type of tampering is common.

With current image technologies, one can easily doctor an image by synthesis. To determine whether an image is doctored, methods and systems are therefore needed that provide efficient and reliable results.

SUMMARY

Aspects of the present invention provide solutions to at least one of the issues mentioned above, thereby enabling one to determine whether an image or a video file/signal has been altered.

With one aspect of the invention, a set of patches are selected and corresponding inverse response functions are provided to a learning machine, e.g., a support vector machine (SVM). The learning machine determines if the inverse response functions are normal or abnormal.

With another aspect of the invention, a feature space of the inverse response functions are analyzed to determine if a tuple of inverse response functions is normal. The feature space comprises a plurality of features. In one embodiment, features include measures for monotonic characteristics, fluctuation characteristics, and divergence characteristics of the red, green, and blue components of the tuple.

With another aspect of the invention, inverse response functions are recovered from image input data by mapping color components back to irradiance.

With another aspect of the invention, a support vector machine is trained with exemplary normal and abnormal inverse response functions. Once trained, the support vector machine analyzes inverse response functions corresponding to a suspected image.

With another aspect of the invention, even though the inverse response functions may be deemed normal, an image is determined to be doctored if the inverse response functions are inconsistent.

With another aspect of the invention, different sets of patches are selected in the image.

The sets of patches are selected in the image foreground, image background, and along a suspected edge of the image. A confidence level is determined for each tuple of inverse response functions. If any tuple is determined to be abnormal, then the image is deemed to be doctored.

These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Aspects of the present invention relate to determining whether an image has been altered. For example, different images can be combined to form a doctored image.

The following is separated by subheadings for the benefit of the reader. The subheadings include: terms, general-purpose computer, and detecting doctored images.

Terms

Doctored Image—an image, e.g., a photograph, that has been changed or falsified.

Learning Machine—an algorithm or a system that finds the optimal function within a given function set that minimizes a particular objective functional, either implicit or explicit.

Support Vector Machine (SVM)—a learning machine that utilizes a specific hyperplane to separate data in the feature space. In the following discussion, image classification includes a real (undoctored) image classification and a doctored image classification. To construct an optimal hyperplane, the SVM uses an iterative training algorithm for minimizing an error function.

Tuple—a finite sequence of n terms. Any time there is a list of n things in a certain order, the list may be referred as an n-tuple. For example, the set $\{1, 2, 3, 4\}$ is a four-tuple. The set of a red component, a green component, and a blue component ($\{r_R(x), r_G(x), r_B(x)\}$) of inverse response functions is a three-tuple.

General Purpose Computer

Figure 1:
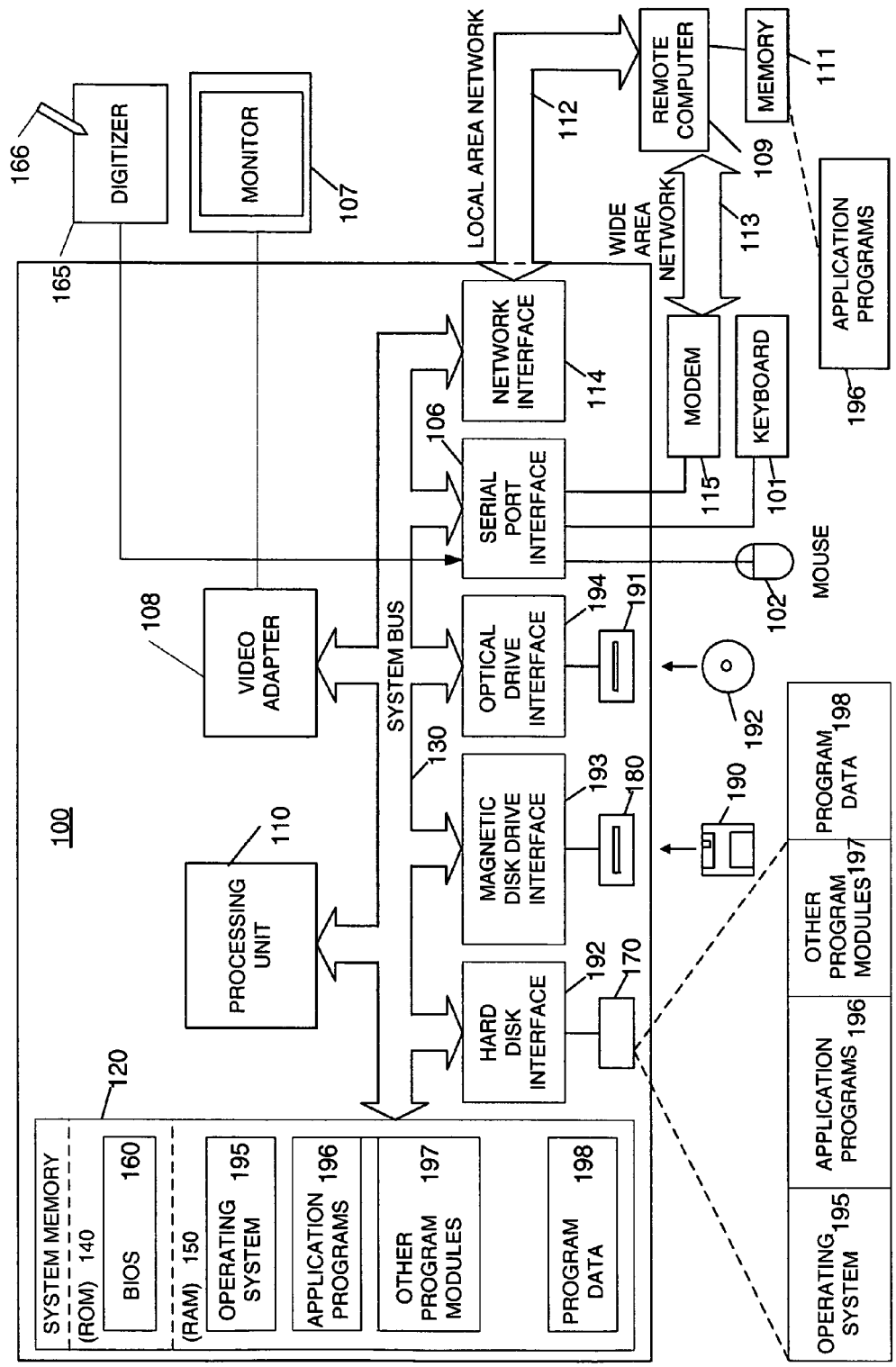
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Computer system 100 may support a scanner (not shown in FIG. 1) that scans photographs (images) and provides pixel information to processing unit 110 in order to analyze an image. Moreover, image information may be provided to processing unit 110 through local area network 112 from remote computer 109 or through serial port interface 106. Also, processing unit 110 may process an image file stored in memory (e.g., hard disk interface 192, magnetic disk drive interface 193, or optical drive interface 194).

Detecting Doctored Images

Numerous image/video editing techniques have been developed so that realistic synthetic images/videos can be produced. With skillful human interaction, many synthesized images and videos are difficult to distinguish from real photos even under close visual examination. Embodiments of the invention provide methods and apparatuses for detecting an altered image that recovers the response function of the camera by analyzing the edges of an image in selected patches. If the image is real (not doctored), then different appropriate sets of patches should result in the same normal camera response functions. If the response functions are abnormal or inconsistent with each other, then the image may be altered (doctored).

Embodiments of the invention are effective for images with high contrast, so that the color range of the selected patches is wide enough. Also, such an image is characterized by a plurality of edges across which the regions are homogeneous, so that a sufficient number of patches for computing the camera response function can be found.

Figure 2:
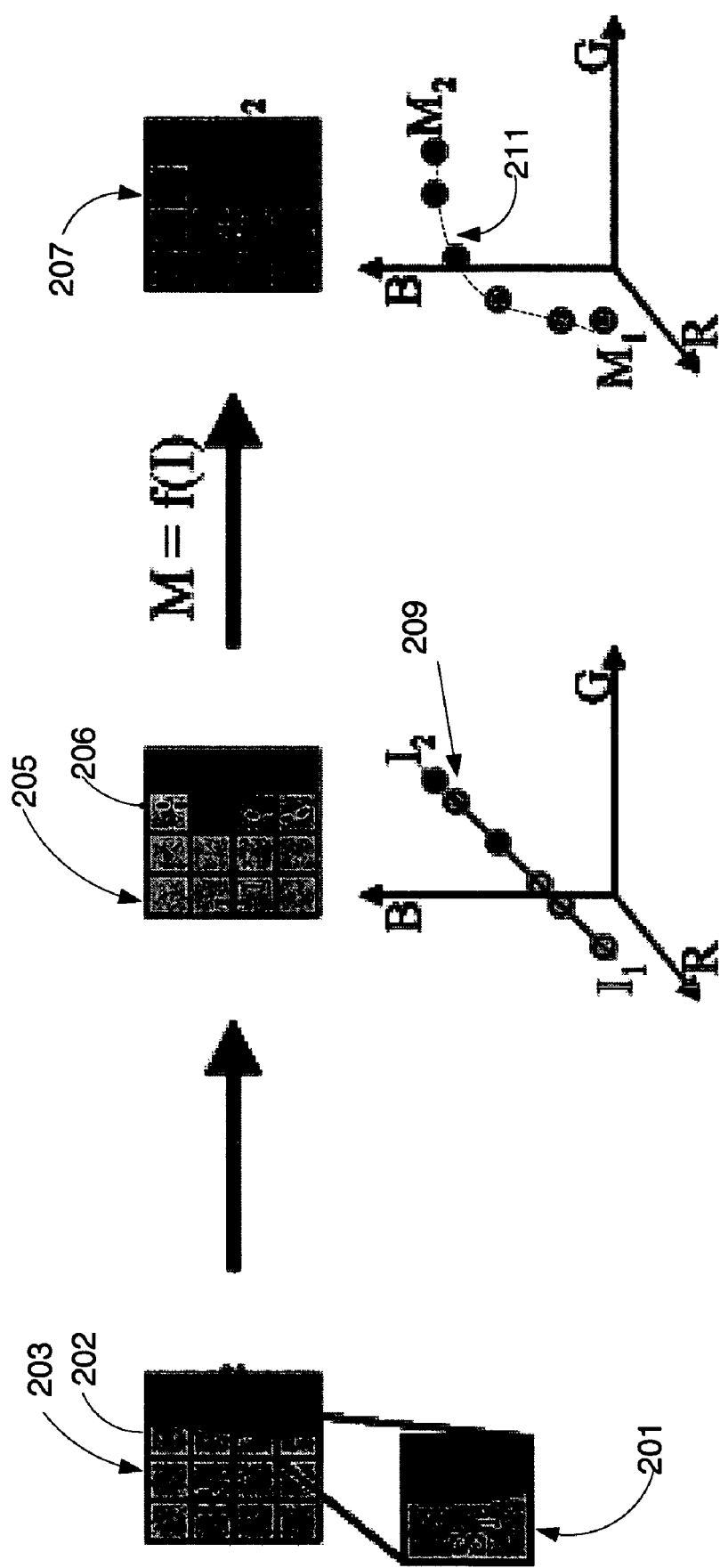
FIG. 2 shows response function recovery in accordance with an embodiment of the invention.

FIG. 2 shows response function recovery in accordance with an embodiment of the invention. A camera response function is the mapping relationship between the pixel irradiance and the pixel value. For cameras with color CCD sensors, each R (red), G (green), and B (blue) channel has a response function (e.g., 301a, 301b, and 301c as will be discussed with FIG. 3). Suppose a pixel is on an edge 202. Scene radiance 203 (corresponding to scene 201) changes across edge 202 and is constant on both sides of edge 202. Then the irradiance (as shown in image irradiance 205) of the pixel on edge 206 should be a linear combination of those of the pixels clear off the edge 206 (as depicted by line 209. However, due to a nonlinear response of the camera, the linear relationship does not hold among the resulting values of the adjacent pixels (as depicted by curve 211 corresponding in measured color image 207). With the assumption that irradiance of a pixel on an edge should be a linear combination of pixels off the edge, an embodiment computes the inverse camera response functions. A function r=f$^{-1}$ (where f is the response function of the camera)' maps the RGB colors back to irradiance, so that the linear relationship around edges is recovered. A procedure for approximating the function r is presented in an article by S. Lin et al., "Radiometric Calibration from a Single Image," 2004 IEEE Computer Society Conference on Computer Vision and Pattern Recognition (CVPR '04), pp. 938-945. One may formulate the problem into finding the MAP solution r* by:

$$r^* = \text{argmax}(p(r|\Omega)) \propto \text{argmax}(p(\Omega|r)p(r)) \quad (EQ. 1)$$

where $\Omega = \{(M_1, M_2, M_p)\}$ is the set of observations ($M_1, M_2$, and $M_p$ are the colors of the non-edge regions and the edge pixel, respectively), p(r) is the a priori distribution of the inverse response function r, represented by a Gaussian Mixture Model which is obtained from the DoRF database (accessible at www.cs.columbia.edu/CAVE), and the likelihood $p(\Omega|r)$ is defined as: $p(\Omega|r) \propto \exp(-\lambda D(r; \Omega))$, in which $D(r; \Omega)$ measures how well the linear relationship is recovered:

$$D(r; \Omega) = \sum_\Omega \frac{\|[r(M_1) - r(M_2)] \times [r(M_1) - r(M_p)]\|}{\|r(M_1) - r(M_2)\|} \quad (EQ. 2)$$

To compute r*, an embodiment of the invention selects patches along edges, so that $\Omega$ can be formed to meet the following requirements:
1. The areas of the two partitioned non-edge regions (regions with colors $M_1$ or $M_2$), should be as close to each other as possible.
2. The color variance inside the two non-edge regions should be as small as possible.
3. The difference between the mean colors of the non-edge regions should be as large as possible.
4. The colors of the pixels inside the edge region should be between those in the non-edge regions. If the color range in the selected patched are not too narrow, the recovered inverse response functions are reported to be quite accurate.

In the above description, the edge regions are the region in the patch where colors change sharply. The non-edge regions are the remaining part of the patch. The non-edge regions are usually two disconnected parts of the patch with the edge region between them.

Figure 3:
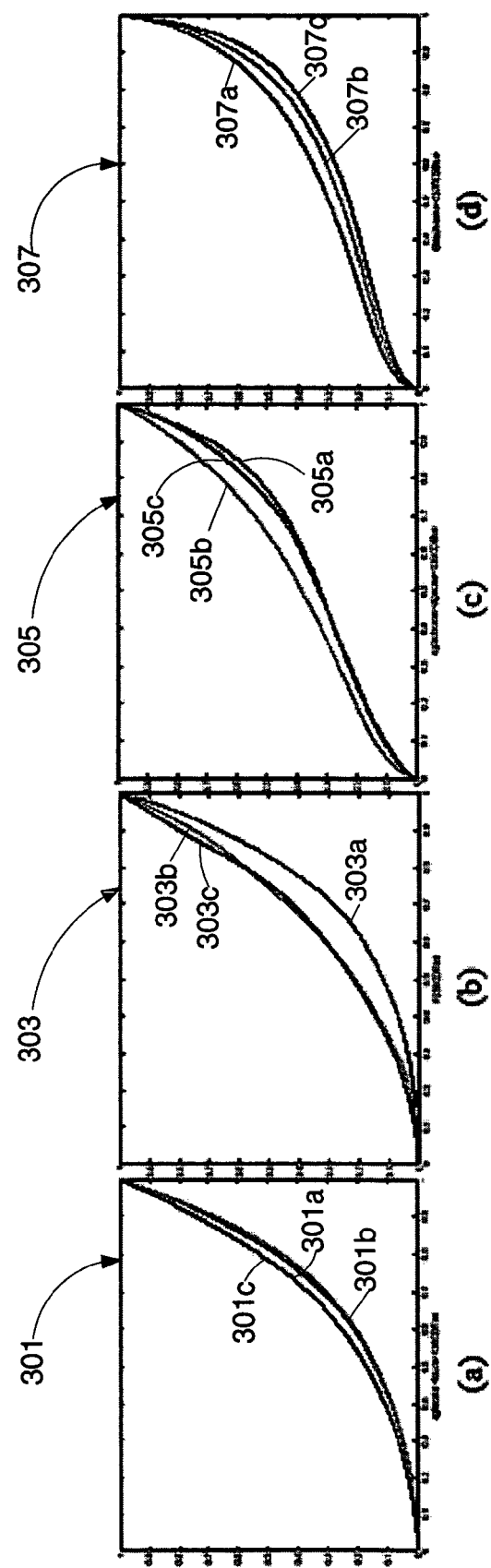
FIG. 3 shows typical inverse response curves in accordance with an embodiment of the invention.

FIG. 3 shows typical inverse response curves in accordance with an embodiment of the invention. Each 3-tuple 301, 303, 305, and 307 includes three color components. Tuple 301 includes red color component 301a, green color component 301b, and blue color component 301c. Similarly, tuple 303 includes red color component 303a, green color component 303b, and blue color component 303c; tuple 305 includes red color component 305a, green color component 305b, and blue color component 305c; and tuple 307 includes red color component 307a, green color component 307b, and blue color component 307c.

As exemplified by the response functions shown in FIG. 3, the camera response functions have the following properties (that is typical for the inverse response functions represented in the DoRF database):
1. All the response functions should be monotonically increasing, i.e., if $x \geq y$ then $r(x) \geq r(y)$. (If a response function is monotonic increasing, the response function is characterized by monotonicity.)
2. All the response functions, after mild smoothing, should have at most one inflection (inflexion) point. (A point is called an inflection point if the function is continuous at the point and the concavity of the graph changes at that point.)
3. The response functions of R, G, and B channels should be close to each other.

If the image formation does not comply with the above properties, one may expect that the recovered inverse response functions exhibit some abnormality or inconsistency.

Figure 4:
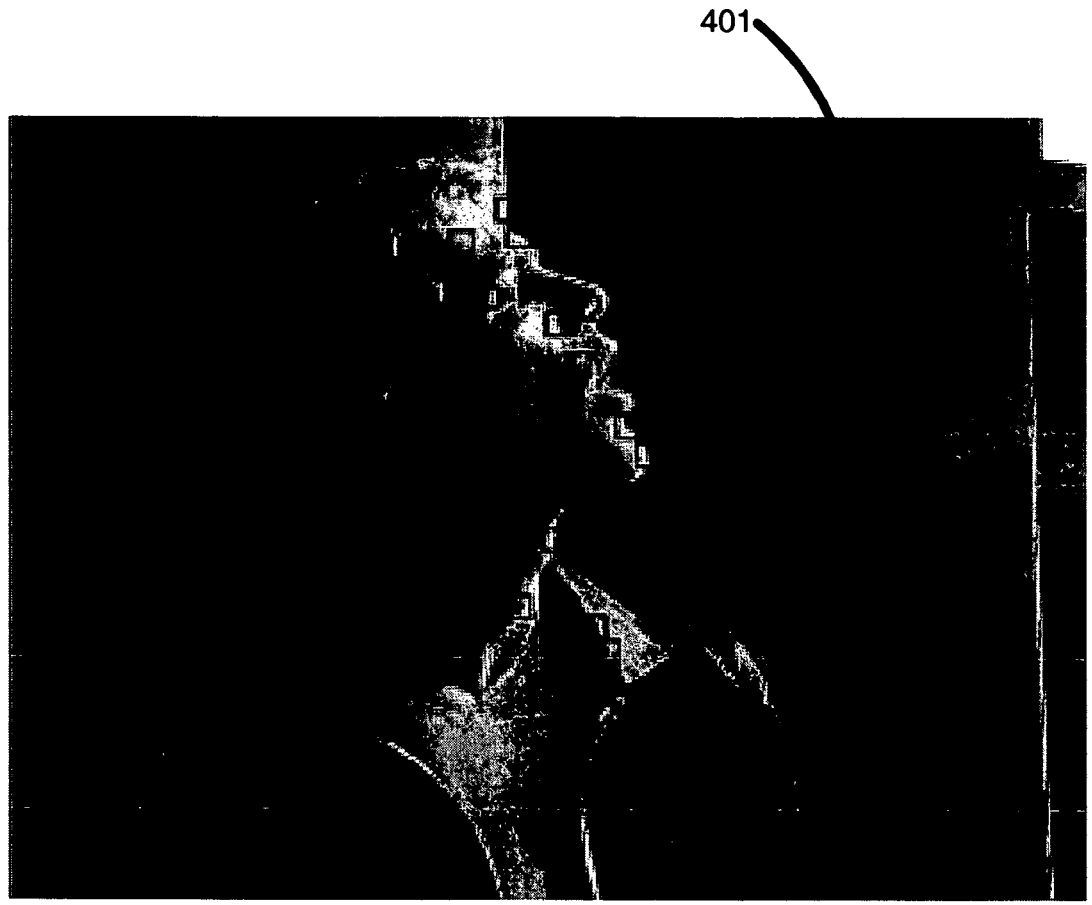
FIG. 4 shows an example of patch selection in accordance with an embodiment of the invention.

Patch selection may be done automatically. However, automatically-selected patches may not always be helpful for analysis. FIG. 4 shows an example of automatic patch selection 401 within image 400 in accordance with an embodiment of the invention. Patch selection 401 is along a path of smoke emanating form the subject's mouth. However, path selection 401 does not provide an accurate analysis of image 400. An embodiment of the invention may utilize manual patch selection.

Figure 5:
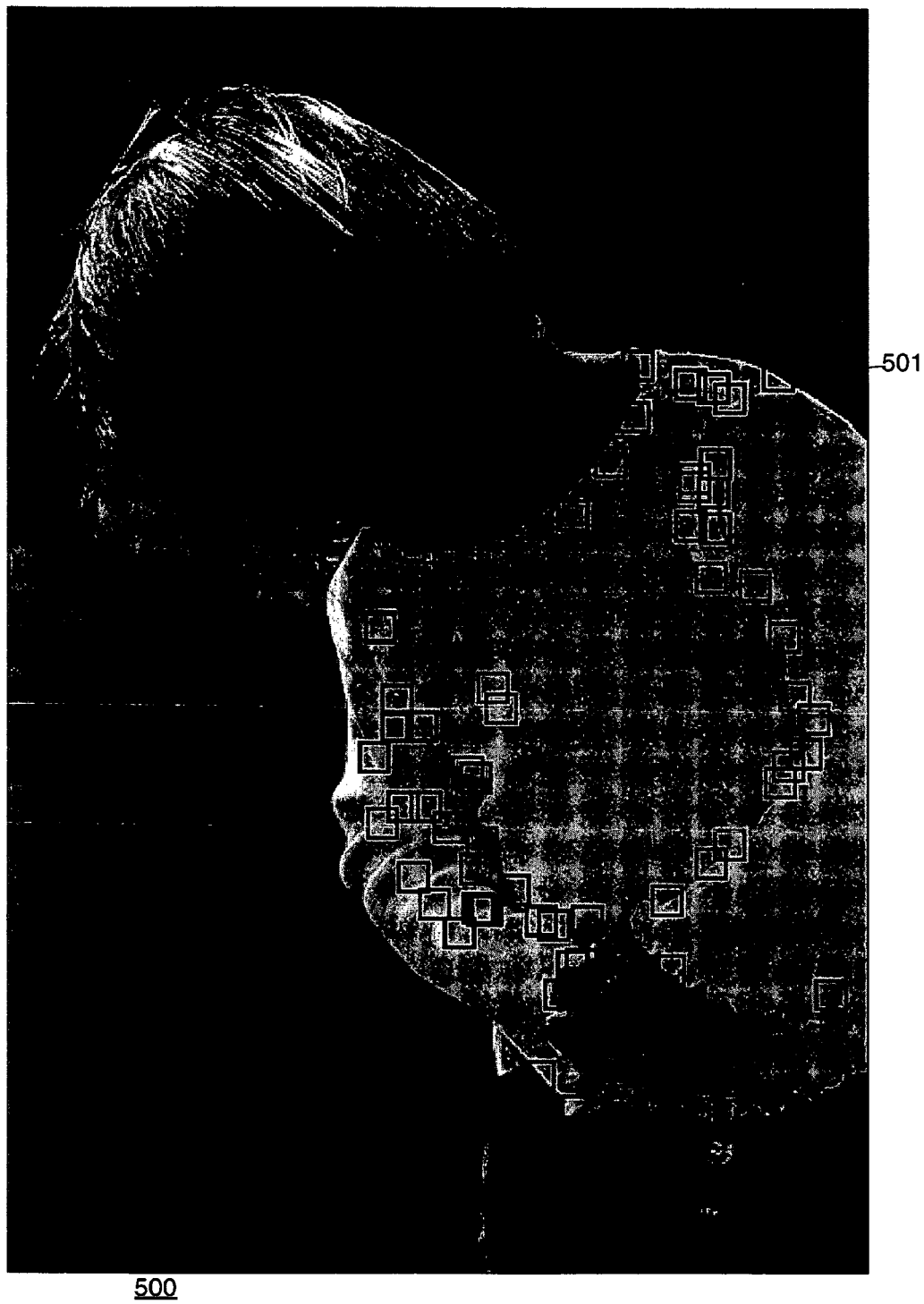
FIG. 5 shows an example of patch selection in accordance with an embodiment of the invention.

FIG. 5 shows an example of patch selection 501 within image 500 in accordance with an embodiment of the invention. Path selection 501 is along a suspected edge. Each square represents a patch along the suspected edge.

To examine a suspected image, the user selects pixels along the edges that may be on the boundary of blended images, or along the edges of different objects. An embodiment of the invention selects a pixel region around the selected pixel to obtain a optimal patch that complies with the following requirements:
  The areas of the two partitioned non-edge regions should be as close to each other as possible.
  The color variance inside the two non-edge regions should be as small as possible.
  The difference between the mean colors of the non-edge regions should be as large as possible.
  The colors of the pixels inside the edge region should be between those in the non-edge regions.

If all the scores of patches around the chosen pixel are too low, then no patch is selected. Embodiments of the invention support both manual selection and automatic selection of patches. Automatic selection may not select "good" patches, and the patches may not be close to the desired edges if patch selection does not adhere to selection criteria such as the selection criteria that were previously discussed.

With the selected patches, an embodiment of the invention computes the inverse response functions $r_i(x)$ (i=R,G,B; $0 \leq x \leq 1$) of R, G, and B channels, where the R, G, and B channels form a tuple of inverse response functions. The embodiment evaluates whether the inverse response functions are normal, according to properties (e.g., features as expressed in Equations 3, 4, and 5) of normal response functions, which also hold for inverse response functions. With an embodiment of the invention, the following three features are extracted for every tuple of inverse response functions:

$$f_{mono} = \sum_{i=R,G,B} \int_0^1 r_i'^-(x)dx \quad EQ.\ 3$$

$$f_{fluc} = \sum_{i=R,G,B} \max(0, N_i - 1) \quad EQ.\ 4$$

$$f_{div} = \int_0^1 (M(x) - m(x))dx \quad EQ.\ 5$$

where $r_i'^-(x) = \max(0, -r_i'(x))$ $N_i$ = the number of intervals on which $r_i''(x) = 0$, $M(x) = \max(r_R(x), r_G(x), r_B(x))$ $m(x) = \min(r_R(x), r_G(x), r_B(x))$ In the above formulae, $r_i'(x)$ and $r_i''(x)$ are the first and second derivatives of $r_i(x)$, respectively. It is easy to see that $f_{mono}$ penalizes non-monotonic $r_i(x)$, $f_{fluc}$ discourages inverse response functions with more than one inflexion point, and $f_{div}$ favors inverse response functions of R, G, and B channels that are close to each other.

To decide whether a three-tuple of inverse response functions is normal or not, a support vector machine (SVM) may be trained. A support vector machine is a learning machine that utilizes a specific hyperplane to separate data in the feature space. In the following discussion, the SVM classifies an image as being a real (undoctored) image classification and a doctored image classification. To construct an optimal hyperplane, the SVM uses an iterative training algorithm for minimizing an error function. The SVM learns the mapping of $x_i$ to $y_i$, where $x_i$ corresponds to inverse response function data and $y_i$ corresponds to an associated "truth" (either an image is doctored or not doctored).

In an embodiment of the invention, the SVM determines at least one predetermined threshold for the feature space (e.g., $f_{mono}$, $f_{fluc}$, and $f_{div}$ as discussed above). Predetermined thresholds may be determined during the training phase, in which normal inverse functions are characterized by positive output of the SVM. Feature values may be compared individually for each feature or jointly for a plurality of features. However, comparing features jointly typically produces more accurate results than individually comparing each feature.

Figure 6:
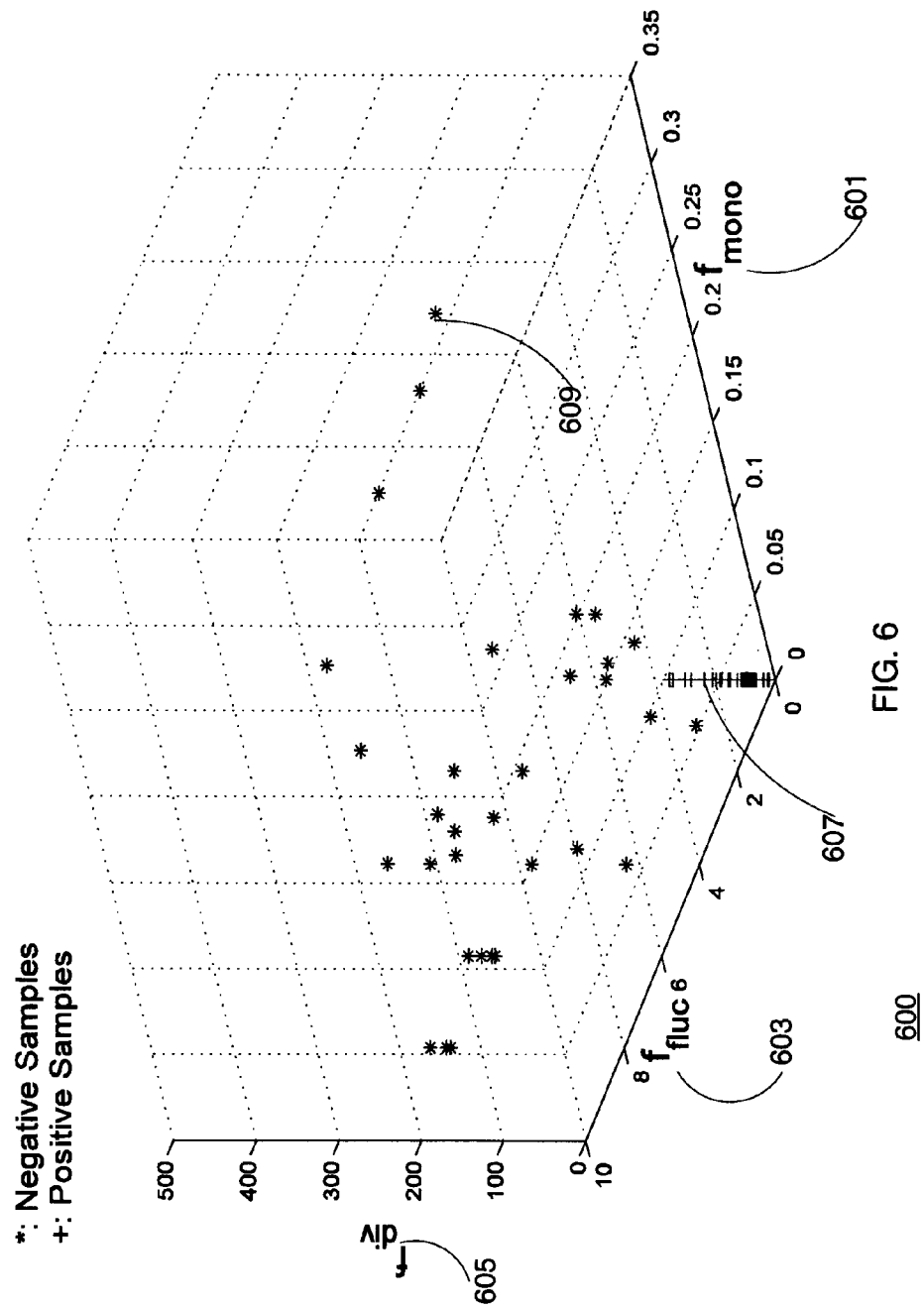
FIG. 6 shows a distribution of inverse response functions in a feature space in accordance with an embodiment of the invention.

FIG. 6 shows a sample distribution of inverse response functions in a feature space 600 in accordance with an embodiment of the invention. Feature space 600 has three dimensions corresponding to $f_{mono}$ 601, $f_{fluc}$ 603, and $f_{div}$ 605. One observes that the normal inverse response functions, e.g., sample 607, are substantially compact in feature space 600, while the abnormal response functions, e.g., sample 609, are dispersed (relative to the normal inverse response functions) throughout feature space 600. This suggests that SVM classification is reliable.

An embodiment of the invention checks other different low-level cues of images, i.e., the response function of the camera. However, with prior art, the blind gamma estimation may also recover the gamma of the response function. In reality, camera response functions typically do not exactly follow a gamma curve. As a result, the estimated gamma may vary significantly on different parts of the image even the image is original, making the detection unreliable. Moreover, blind gamma estimation tests regions of an image so that the Fourier transform can be applied. In contrast, an embodiment of the invention checks the edges of an image and may be applied in difference situations. In principle, blind gamma estimation can compute the 4D bicoherence in order to detect the tampering on 2D images; however, the computation may be formidable. As a result, prior art resorts to row-wise (or column-wise) gamma estimation that only requires 2D bicoherence. Therefore, if the tampered region is surrounded by original regions, then the tampering may not be detected. Unfortunately, such kind of tampering is the most common.

The advance in image/video editing techniques has facilitated people in synthesizing realistic images/videos that may hard to be distinguished from real ones by visual examination. This poses a problem: how to differentiate real images/videos from doctored ones? This is a serious problem because legal issues may occur if there is no reliable way for doctored image/video detection when human inspection fails. Digital watermarking cannot solve this problem completely. An embodiment of the invention computes the response functions of the camera by selecting appropriate patches in different ways (e.g., an image background, an image foreground, and image edges). An image may be doctored if the response functions are abnormal or inconsistent to each other. The normality of the response functions is classified by an SVM that is trained with exemplary inverse response functions that are either categorized as normal or abnormal using the properties expressed in Equations 3, 4, and 5. Experiments suggest that the embodiments are effective for high-contrast images with many textureless edges.

Doctored images/videos can be detected in several levels. With a high level of analysis, one may analyze what are inside the image/video, the relationship between the objects, etc. For example, George Washington cannot appear in photos with George Bush, and a human cannot walk outside a space shuttle without a space suit. With a middle level of analysis, one may check the image consistency, such as consistency in object sizes, color temperature, shading, shadow, occlusion, and sharpness. With a low level of analysis, local features may be extracted for analysis, such as the quality of edge fusion, noise level, and watermarking. A user may be very good with high level analysis and with middle level analysis, but, to a lesser degree, with low level analysis. However, a computer system typically excels with middle level analysis and with low level analysis to complement user examination when visual clues are missing. Consequently, an embodiment of the invention enables a user to interact with a computer system to provide high level analysis. Doctored images may be detected by recovering the response function of the camera by analyzing the edges of an image. An embodiment of the invention examines the patches along edges. If the image is real (undoctored), then different sets of patches should result in the same normal camera response functions. If the response functions are abnormal or inconsistent with each other (as will be discussed in more detail with FIG. 21), the image may be doctored. The embodiment checks different low-level clues of images, i.e., the response function of the camera.

Figure 7:
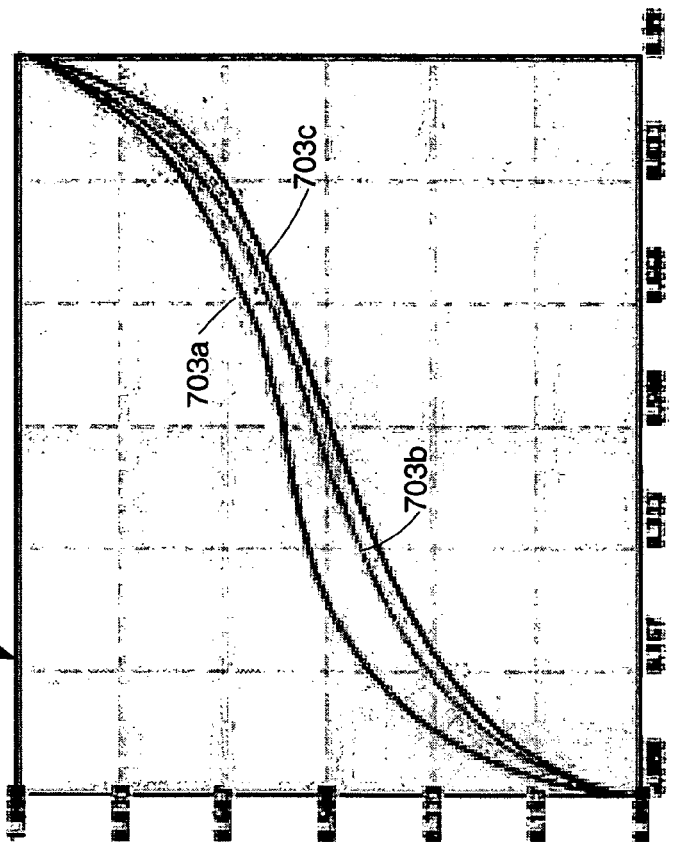
FIG. 7 shows computed inverse response functions with a corresponding real (undoctored) image in which patches are selected from a foreground in accordance with an embodiment of the invention.
Figure 7:

FIG. 7 shows computed inverse response functions with a corresponding real image (undoctored) 701 in which patches are selected from a foreground in accordance with an embodiment of the invention. The patches are identified as a set of squares within image 701 in the image foreground. Corresponding inverse response functions 703 are shown as 703a, 703b, and 703c corresponding to the red, green, and blue tuple components, respectively. The SVM has determined the confidence level to be 0.66, which is a positive value and indicative of an undoctored image.

Figure 8:
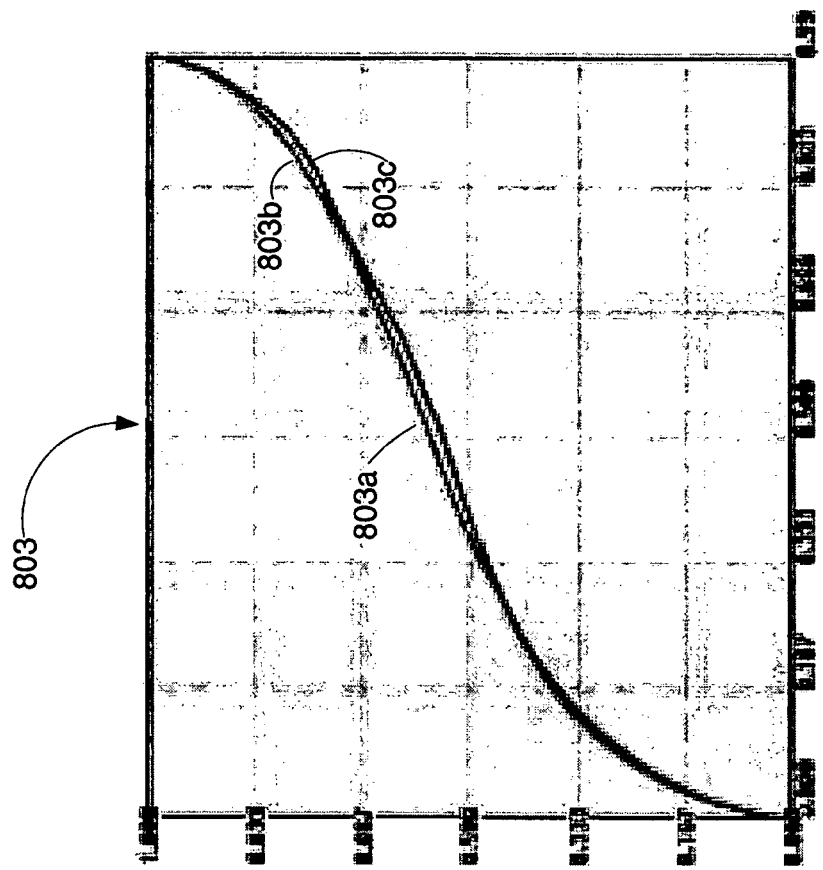
FIG. 8 shows computed inverse response functions with a corresponding real image in which patches are selected from a suspected edge in accordance with an embodiment of the invention.
Figure 8:

FIG. 8 shows computed inverse response functions with a corresponding real image 801 (which is from the same photograph as image 701) in which patches are selected from a suspected edge in accordance with an embodiment of the invention. (In fact images 701-1301 are undoctored and are from the same photograph.) The patches are identified as a set of squares within image 801 along the suspected edge. The corresponding inverse response functions are inverse response functions 803, which comprise red (803a), green (803b), and blue (803c) components. The SVM has determined the confidence level to be 1.77, which is a positive value and indicative of an undoctored image. In this example, one should note that the confidence level that the image is substantially when patches are taken along the suspected edge than in the image foreground.

Figure 9:
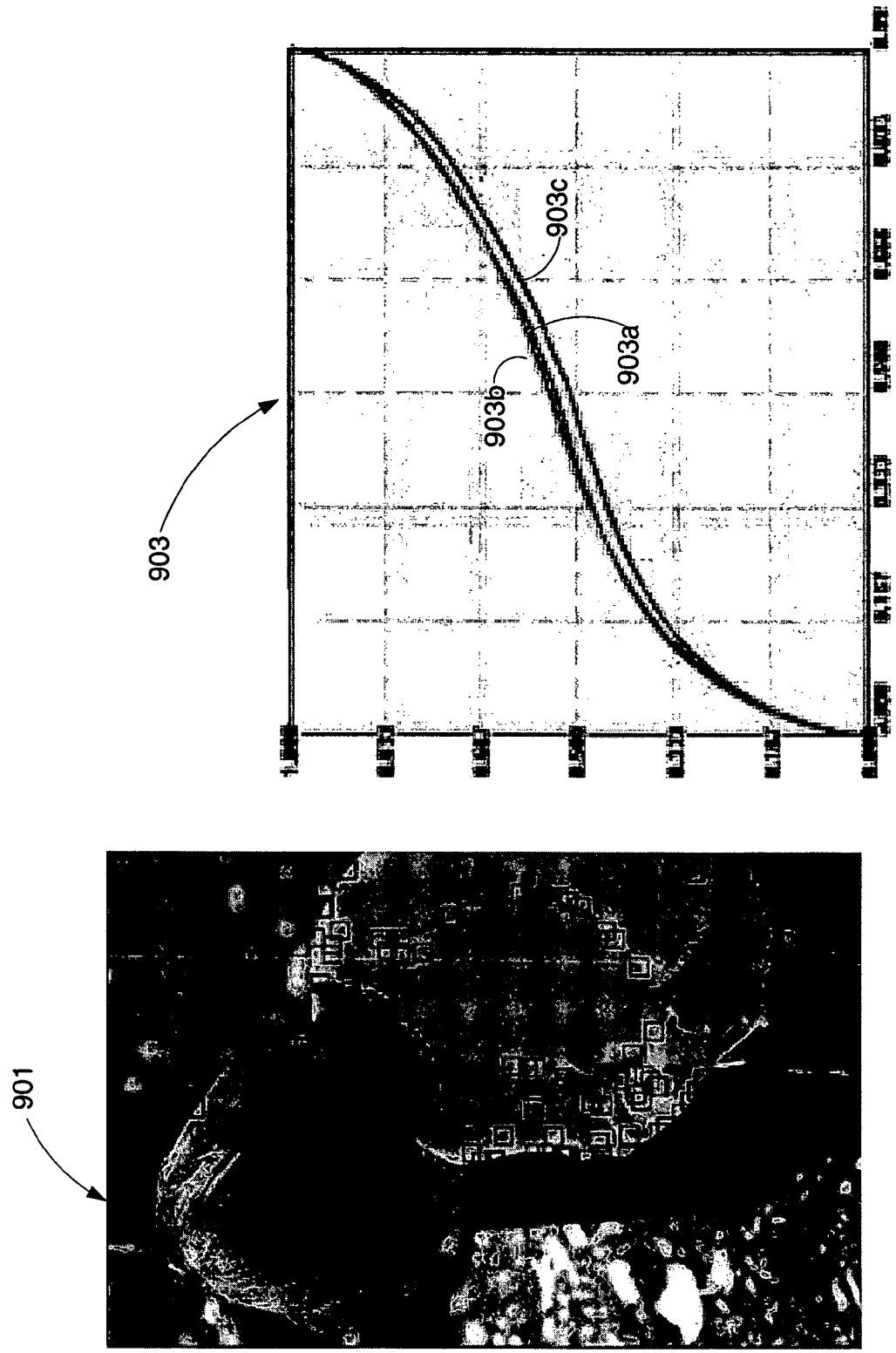
FIG. 9 shows computed inverse response functions with a corresponding real image in which patches are selected from a foreground and a suspected edge in accordance with an embodiment of the invention.

FIG. 9 shows computed inverse response functions with a corresponding real image 901 in which patches are selected from a foreground and a suspected edge in accordance with an embodiment of the invention. The patches are identified as a set of squares within image 901 along the suspected edge and the image foreground. The corresponding inverse response functions are inverse response functions 903, which comprise red (903a), green (903b), and blue (903c) components. The SVM has determined the confidence level to be 1.56, which is a positive value and indicative of an undoctored image.

Figure 10:
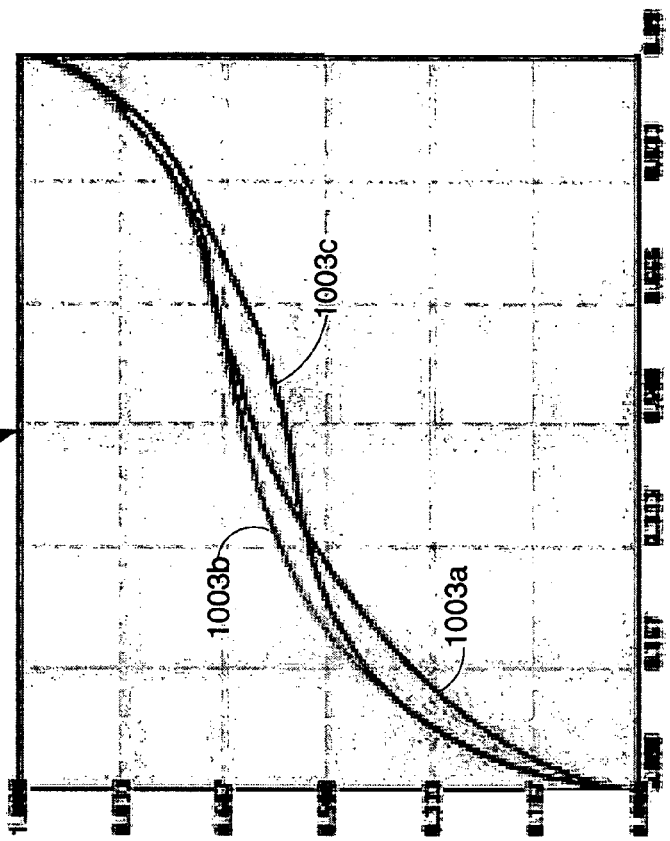
FIG. 10 shows computed inverse response functions with a corresponding real image in which patches are selected from a background in accordance with an embodiment of the invention.
Figure 10:

FIG. 10 shows computed inverse response functions with a corresponding real image in which patches are selected from a background in accordance with an embodiment of the invention. The patches are identified as a set of squares within image 1001 within the image background. The corresponding inverse response functions are inverse response functions 1003, which comprise red (1003a), green (1003b), and blue (1003c) components. The SVM has determined the confidence level to be 1.11, which is a positive value and indicative of an undoctored image.

Figure 11:
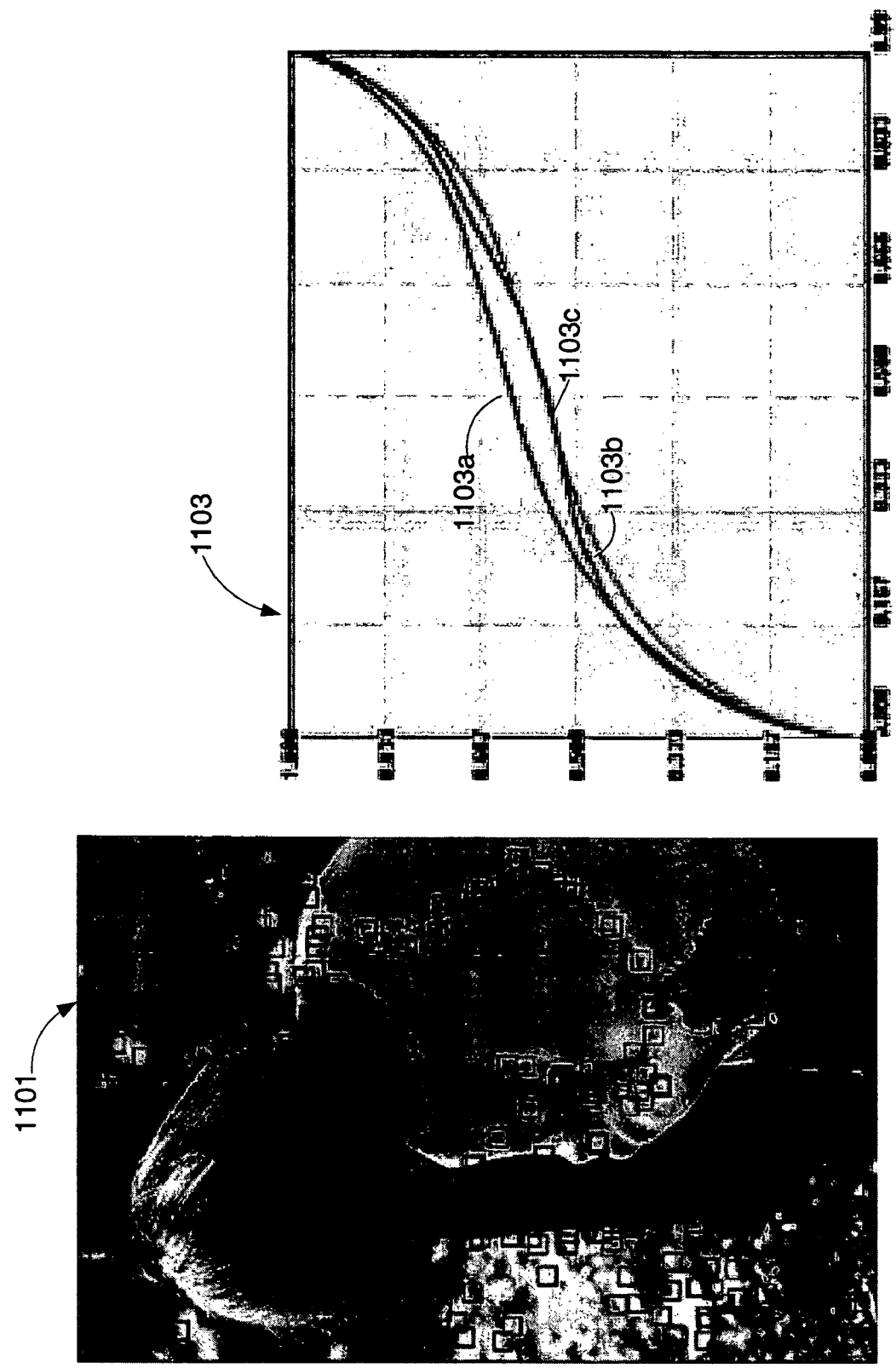
FIG. 11 shows computed inverse response functions with a corresponding real image in which patches are selected from a background and a foreground in accordance with an embodiment of the invention.

FIG. 11 shows computed inverse response functions with a corresponding real image in which patches are selected from a background and a foreground in accordance with an embodiment of the invention. The patches are identified as a set of squares within image 1101 within the image background and the image foreground. The corresponding inverse response functions are inverse response functions 1103, which comprise red (1103a), green (1103b), and blue (1103c) components. The SVM has determined the confidence level to be 1.24, which is a positive value and indicative of an undoctored image.

Figure 12:
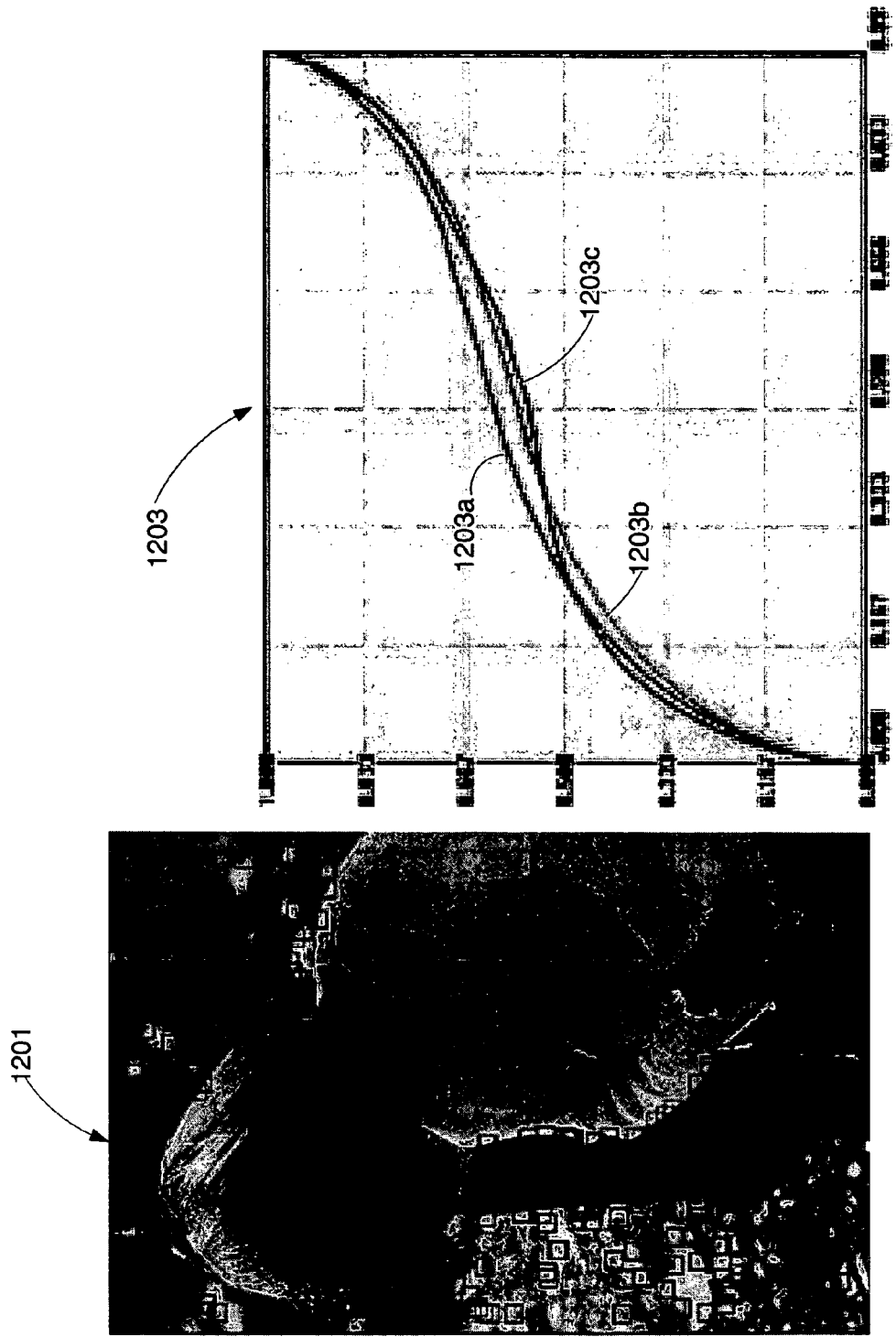
FIG. 12 shows computed inverse response functions with a corresponding real image in which patches are selected from a background and a suspected edge in accordance with an embodiment of the invention.

FIG. 12 shows computed inverse response functions with a corresponding real image in which patches are selected from a background and a suspected edge in accordance with an embodiment of the invention. The patches are identified as a set of squares within image 1201 within the image background and the suspected edge. The corresponding inverse response functions are inverse response functions 1203, which comprise red (1203a), green (1203b), and blue (1203c) components. The SVM has determined the confidence level to be 1.36, which is a positive value and indicative of an undoctored image.

Figure 13:
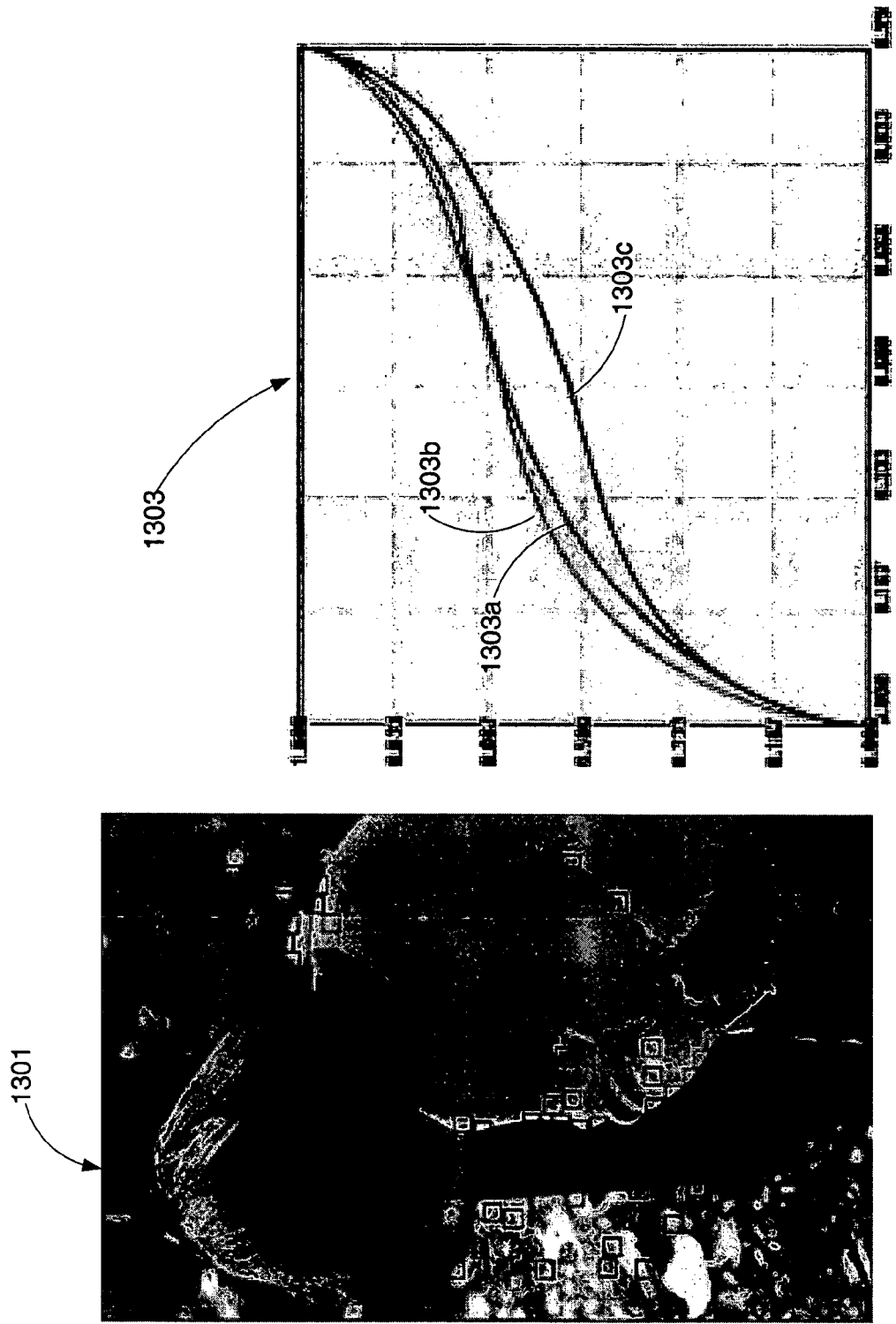
FIG. 13 shows computed inverse response functions with a corresponding real image in which patches are selected across the entire image in accordance with an embodiment of the invention.

FIG. 13 shows computed inverse response functions with a corresponding real image in which patches are selected across the entire image in accordance with an embodiment of the invention. The patches are identified as a set of squares along the entire image 1201. The corresponding inverse response functions are inverse response functions 1303, which comprise red (1303a), green (1303b), and blue (1303c) components. The SVM has determined the confidence level to be 0.53, which is a positive value and indicative of an undoctored image.

The associated confidence levels for FIGS. 7-13 vary according to the patch selection. Note, however, that the confidence levels for all the patch selections are positive. The ordering of confidence levels, as a function of the patch selection, may change depending on the image being analyzed. However, the confidence levels are positive for all path selection, and the inverse response functions are deemed to be consistent. As will be discussed with flow diagram 2100, the image is determined to be undoctored.

Figure 14:
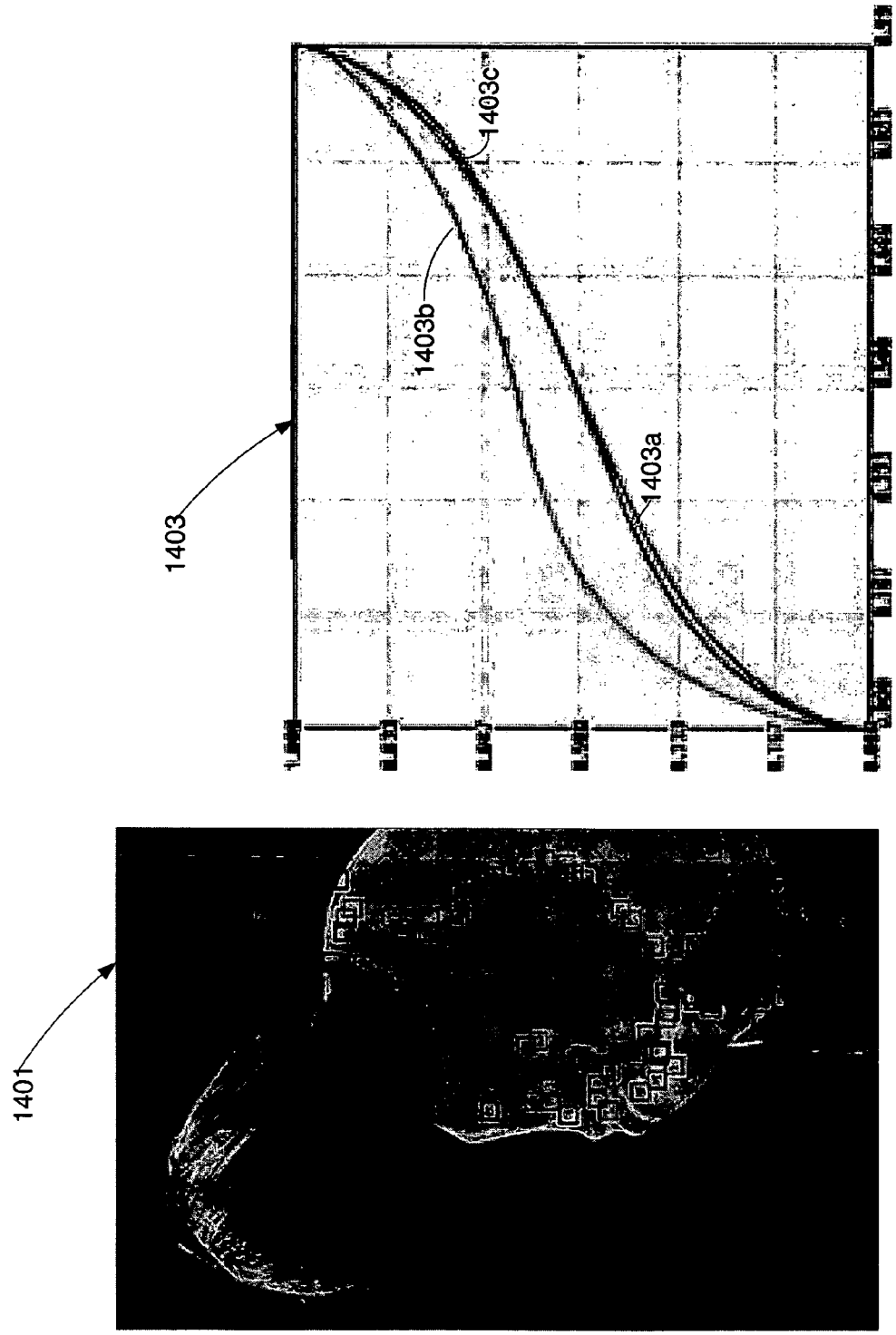
FIG. 14 shows computed inverse response functions with a corresponding doctored image in which patches are selected from a foreground in accordance with an embodiment of the invention.

FIG. 14 shows computed inverse response functions with a corresponding doctored image 1401 in which patches are selected from a foreground in accordance with an embodiment of the invention. The patches are identified as a set of squares within image 1401 in the image foreground. Corresponding inverse response functions 1403 are shown as 1403a, 1403b, and 1403c corresponding to the red, green, and blue tuple components, respectively. The SVM has determined the confidence level to be 0.32, which is a positive value and indicative of an undoctored image.

Figure 15:
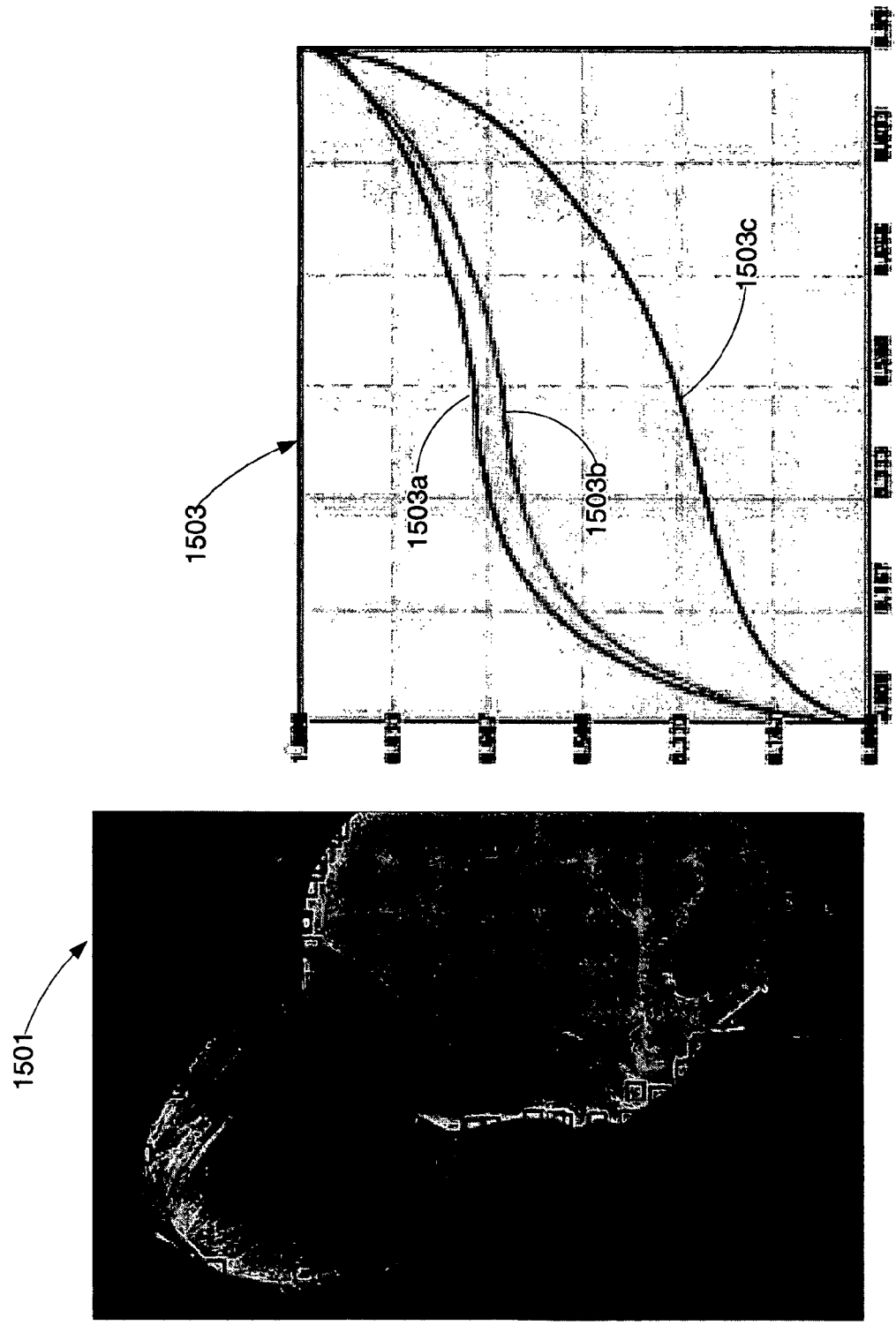
FIG. 15 shows computed inverse response functions with a corresponding doctored image in which patches are selected from a suspected edge in accordance with an embodiment of the invention.

FIG. 15 shows computed inverse response functions with a corresponding doctored image 1501 in which patches are selected from a suspected edge in accordance with an embodiment of the invention. The patches are identified as a set of squares within image 1501 along the suspected edge. The corresponding inverse response functions are inverse response functions 1503, which comprise red (1503a), green (1503b), and blue components (1503c). The SVM has determined the confidence level to be −2.73, which is a negative value and indicative of a doctored image. In fact, the magnitude is sufficiently large, and consequently the level of confidence is high that the image is doctored.

Figure 16:
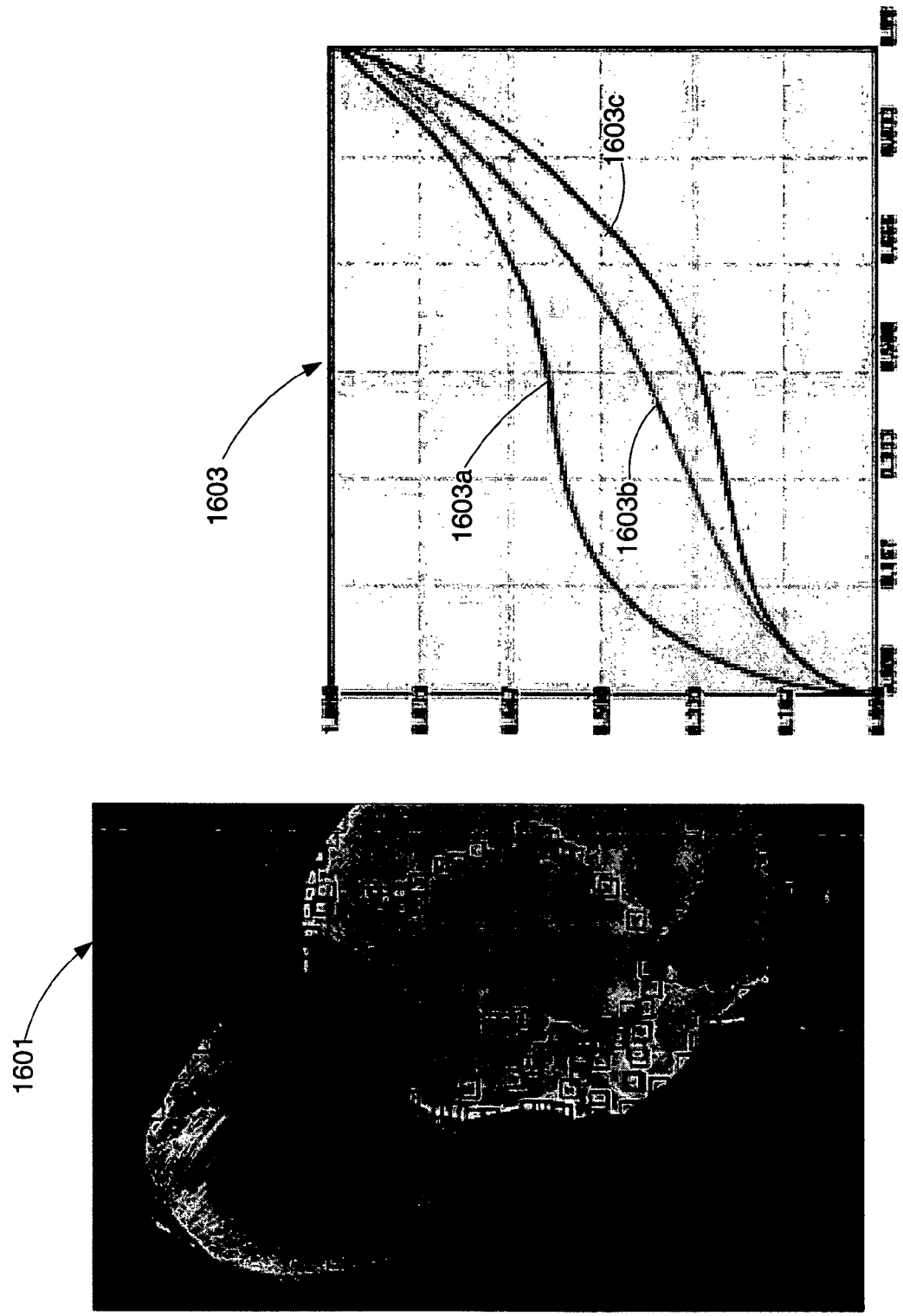
FIG. 16 shows computed inverse response functions with a corresponding doctored image in which patches are selected from a foreground and a suspected edge in accordance with an embodiment of the invention.

FIG. 16 shows computed inverse response functions with a corresponding doctored image 1601 in which patches are selected from a foreground and a suspected edge in accordance with an embodiment of the invention. The patches are identified as a set of squares within image 1601 along the image foreground and the suspected edge. The corresponding inverse response functions are inverse response functions 1603, which comprise red (1603a), green (1603b), and blue (1603c) components. The SVM has determined the confidence level to be −1.55, which is a negative value and indicative of a doctored image. (The larger the magnitude of the confidence level, the more one is confident about the conclusion.)

Figure 17:
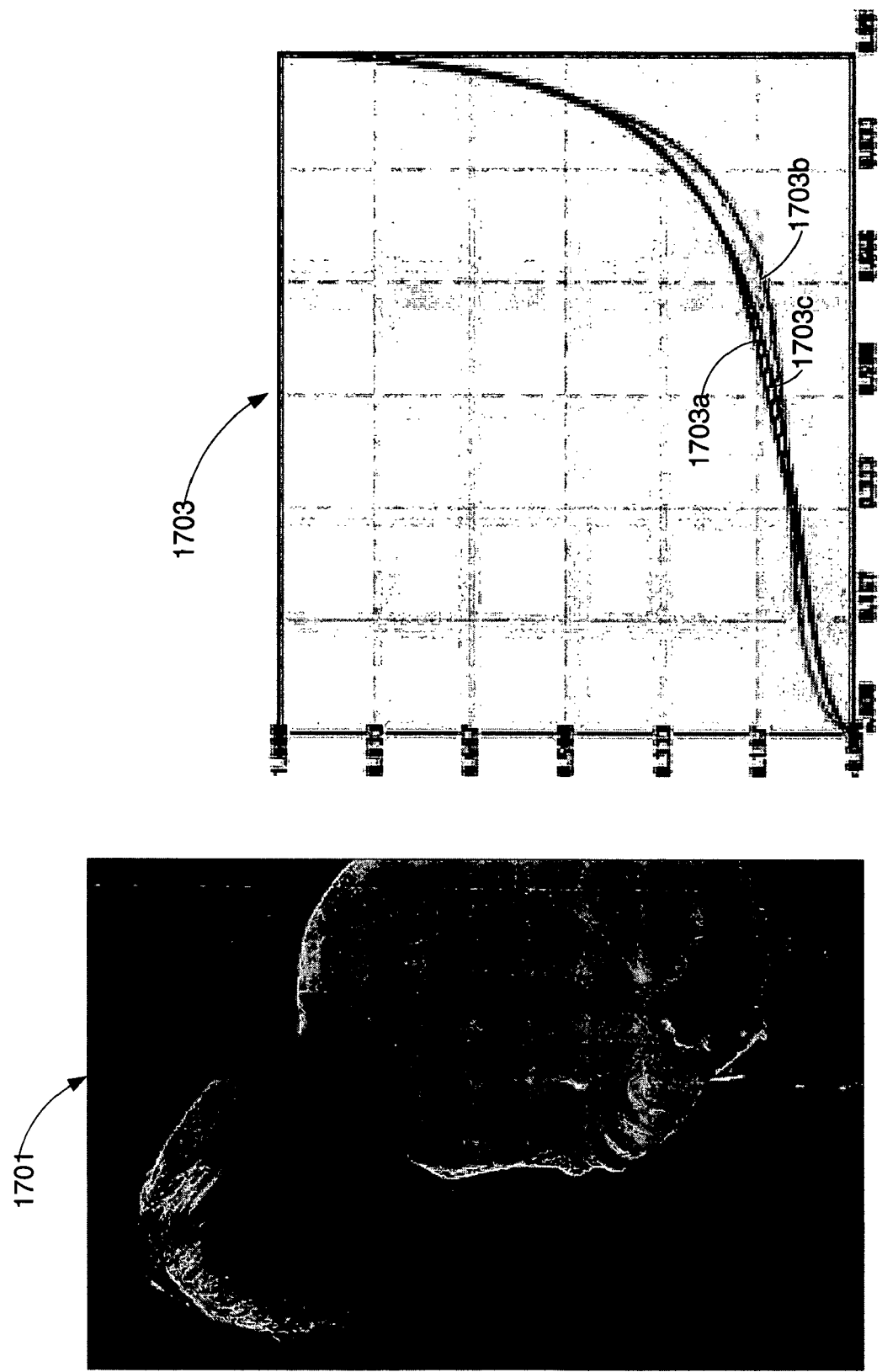
FIG. 17 shows computed inverse response functions with a corresponding doctored image in which patches are selected from a background in accordance with an embodiment of the invention.

FIG. 17 shows computed inverse response functions with a corresponding doctored image 1701 in which patches are selected from a background in accordance with an embodiment of the invention. The patches are identified as a set of squares within image 1701 within the image background. The corresponding inverse response functions are inverse response functions 1703, which comprise red (1703a), green (1703b), and blue (1703c) components. The SVM has determined the confidence level to be 1.55, which is a positive value and indicative of an undoctored image.

Figure 18:
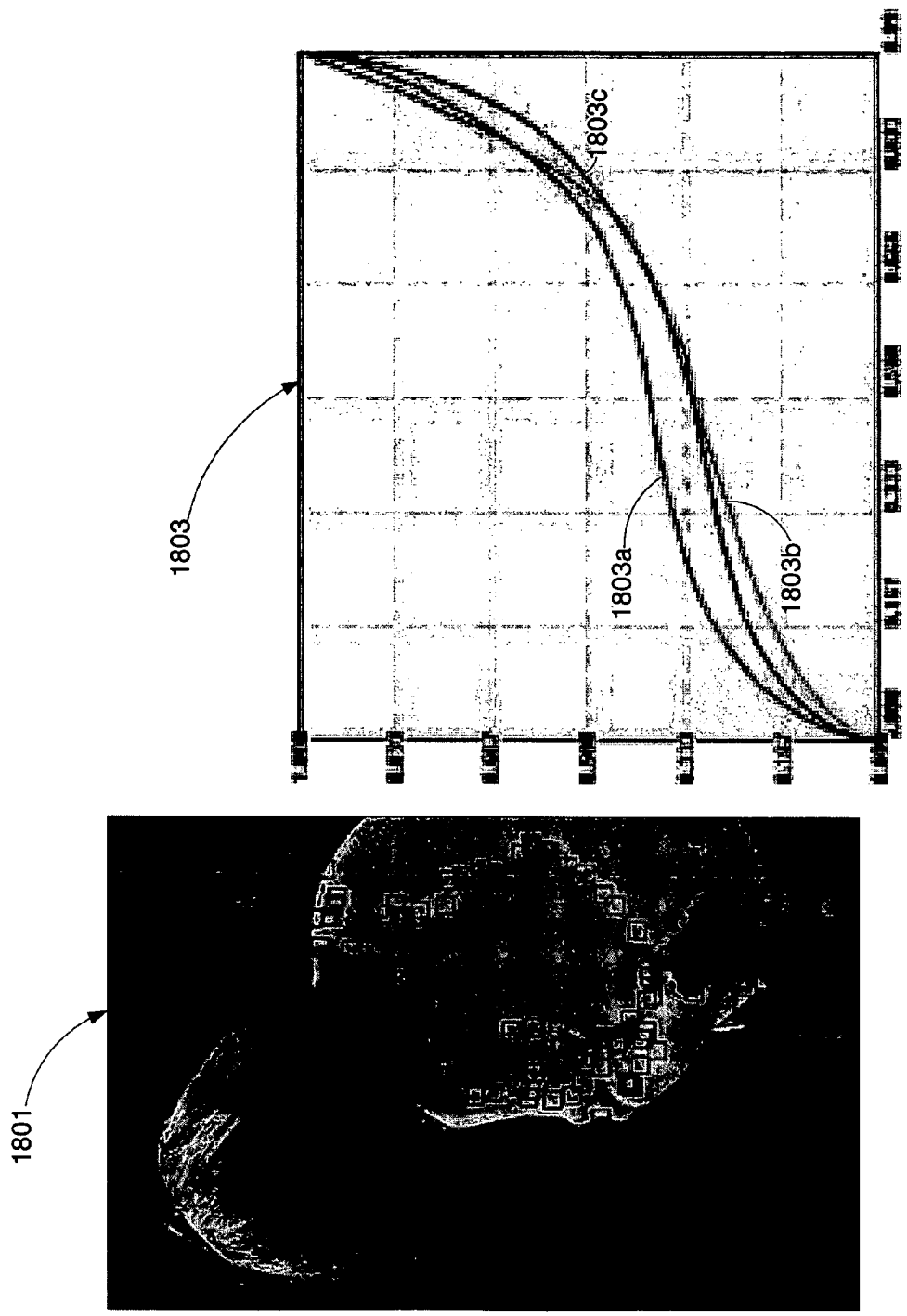
FIG. 18 shows computed inverse response functions with a corresponding doctored image in which patches are selected from a background and a foreground in accordance with an embodiment of the invention.

FIG. 18 shows computed inverse response functions with a corresponding doctored image 1801 in which patches are selected from a background and a foreground in accordance with an embodiment of the invention. The patches are identified as a set of squares within image 1801 within the image background and foreground. The corresponding inverse response functions are inverse response functions 1803, which comprise red (1803a), green (1803b), and blue (1803c) components. The SVM has determined the confidence level to be 0.66, which is a positive value and indicative of an undoctored image.

Figure 19:
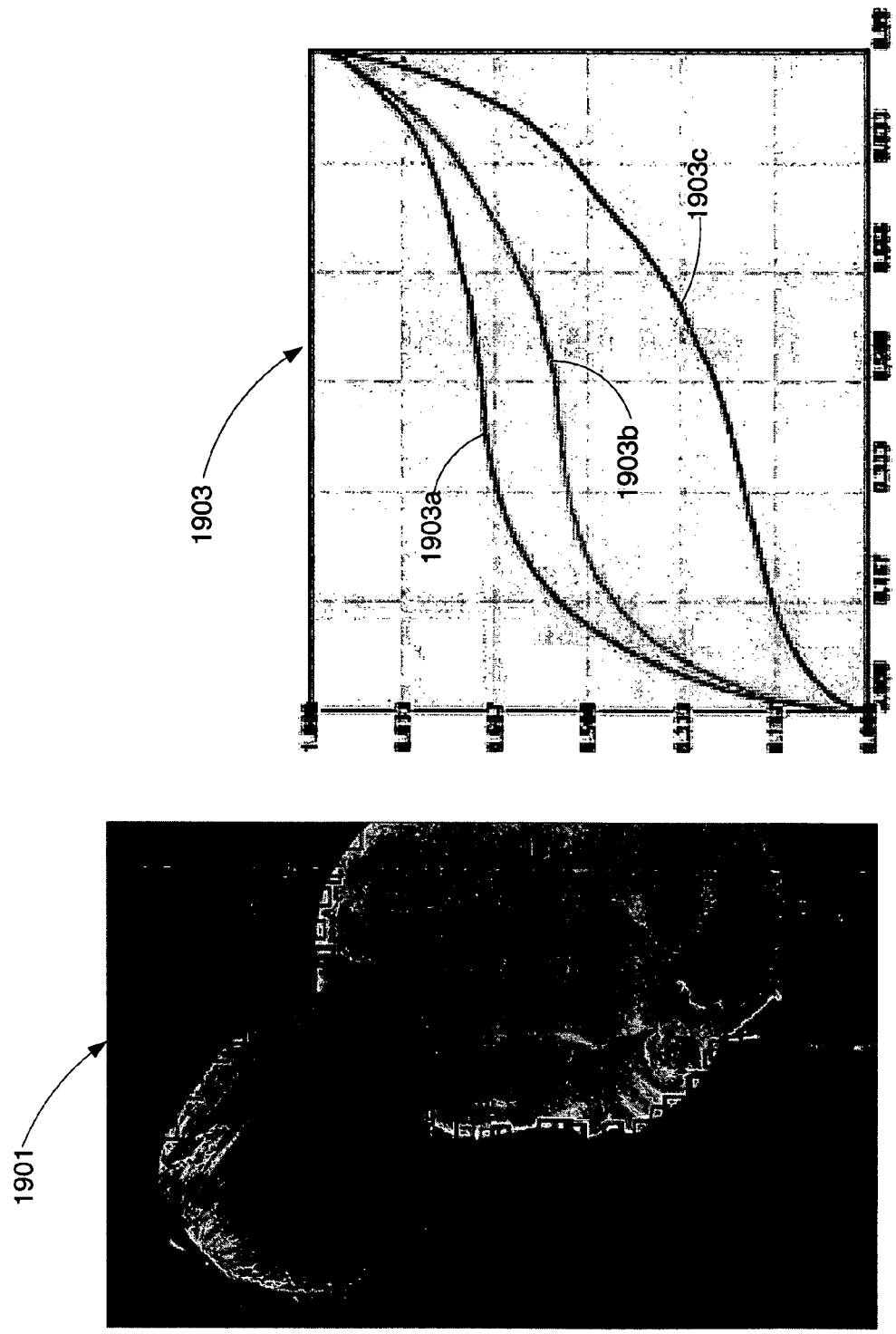
FIG. 19 shows computed inverse response functions with a corresponding doctored image in which patches are selected from a background and a suspected edge in accordance with an embodiment of the invention.

FIG. 19 shows computed inverse response functions with a corresponding doctored image 1901 in which patches are selected from a background and a suspected edge in accordance with an embodiment of the invention. The patches are identified as a set of squares within image 1901 within the image background and along the suspected edge and foreground. The corresponding inverse response functions are inverse response functions 1903, which comprise red (1903a), green (1903b), and blue (1903c) components. The SVM has determined the confidence level to be −3.43, which is a negative value and indicative of a doctored image.

Figure 20:
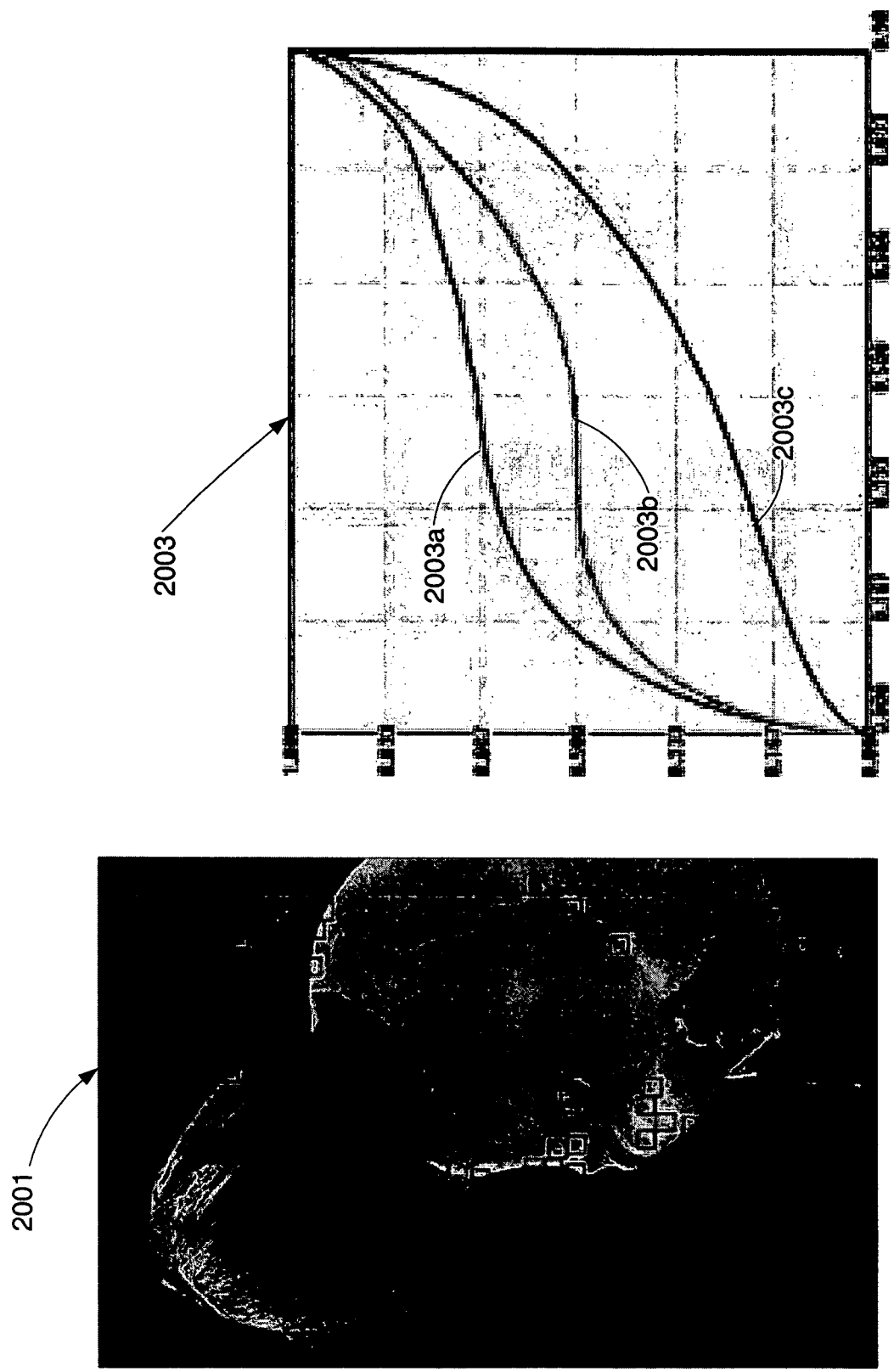
FIG. 20 shows computed inverse response functions with a corresponding doctored image in which patches are selected across the entire image in accordance with an embodiment of the invention.

FIG. 20 shows computed inverse response functions with a corresponding doctored image 2001 in which patches are selected across the entire image in accordance with an embodiment of the invention. The patches are identified as a set of squares for entire image 2001. The corresponding inverse response functions are inverse response functions 2003, which comprise red (2003*a*), green (2003*b*), and blue (2003*c*) components. The SVM has determined the confidence level to be −3.40, which is a negative value and indicative of a doctored image.

For the examples shown in FIGS. 14-20, one notes that the confidence level may be positive or negative for a doctored image, depending on the patch selection. In fact, as shown in the flow diagram 2100, if any patch selection results in a negative confidence, then the image is deemed to be doctored. Moreover, the determined inverse response functions (comparing 1403, 1503, 1603, 1703, 1803, 1903, and 2003) are not consistent.

Figure 21:
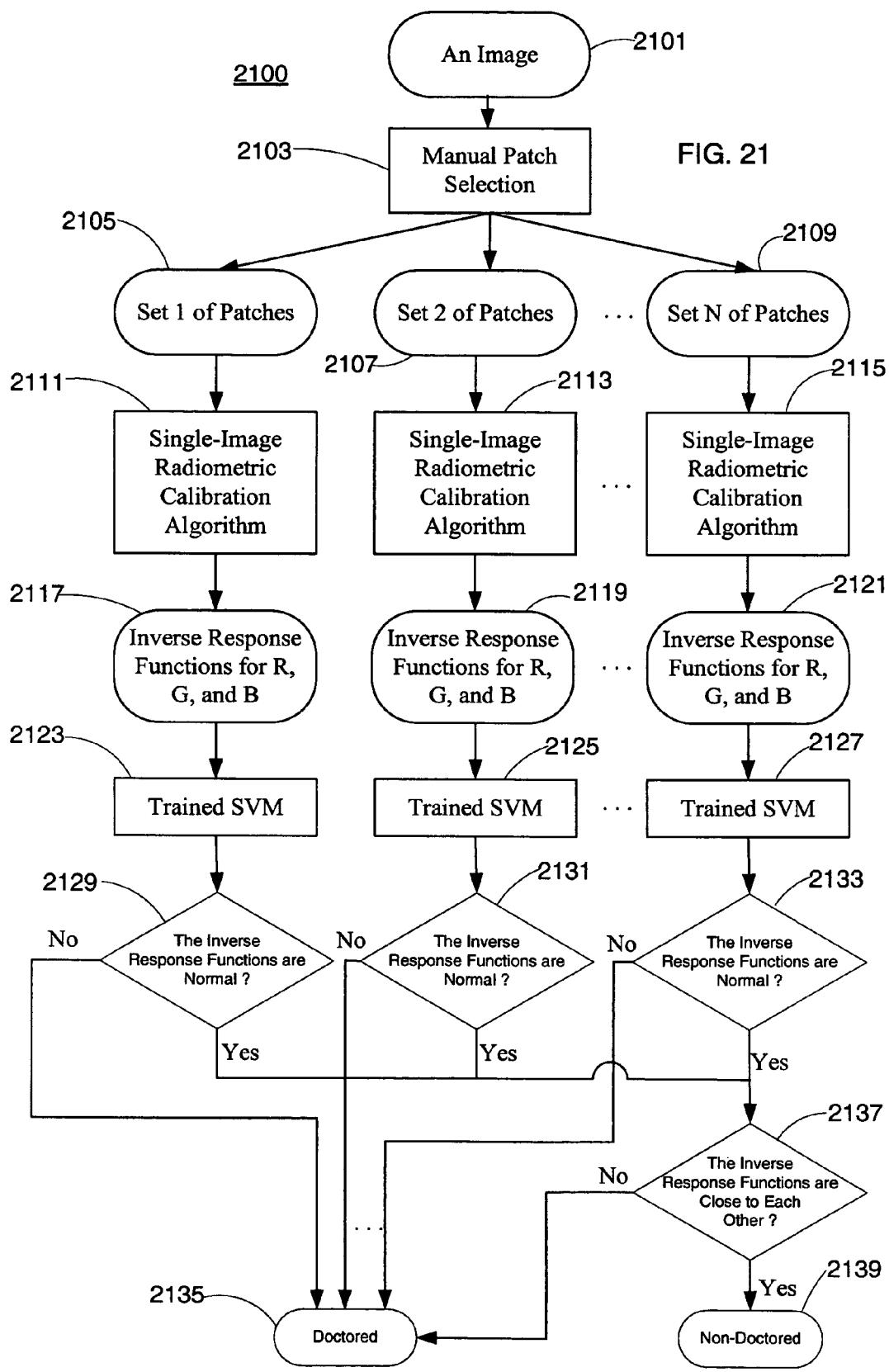
FIG. 21 shows a flow diagram for detecting a doctored image in accordance with an embodiment of the invention.

FIG. 21 shows flow diagram 2100 for detecting a doctored image in accordance with an embodiment of the invention. Patches are selected in step 2103 for image 2101. In flow diagram 2100, N sets of patches (2105, 2107, and 2109) are selected. (The embodiment supports any number of patch sets. For example, the number of patch sets may be greater than three.) In steps 2111-2115, single-image radiometric calibration is performed. Single-camera radiometrix calibration enables the inverse response functions of cameras to be computed from a single image.

In steps 2117-2121 the inverse response functions are determined for each set of patches, where each set of patches corresponds to a tuple of inverse response functions. Trained SVM 2123-2127 processes each tuple of response functions to determine whether the inverse response functions are normal and determines the corresponding confidence levels. The inverse response functions for a set of patches are deemed to be normal if the confidence level is positive and to be abnormal if the confidence level is negative (as determined in steps 2129-2133). If any tuple is deemed to be abnormal, then the image is classified as being doctored in step 2135.

If the inverse response functions for all tuples are deemed to be normal, step 2137 determines whether the inverse response functions are consistent (i.e., sufficiently close to each other). For example, one may compute the variance of all the inverse response functions computed from different patch sets.

The following examples show doctored images and the resulting analysis by an embodiment of the invention.

Figure 22:
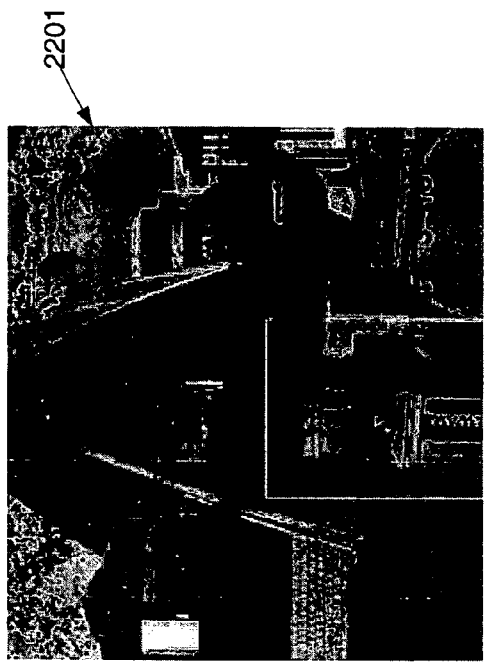
FIG. 22 shows computed inverse response functions with a corresponding doctored image in accordance with an embodiment of the invention.
Figure 22:
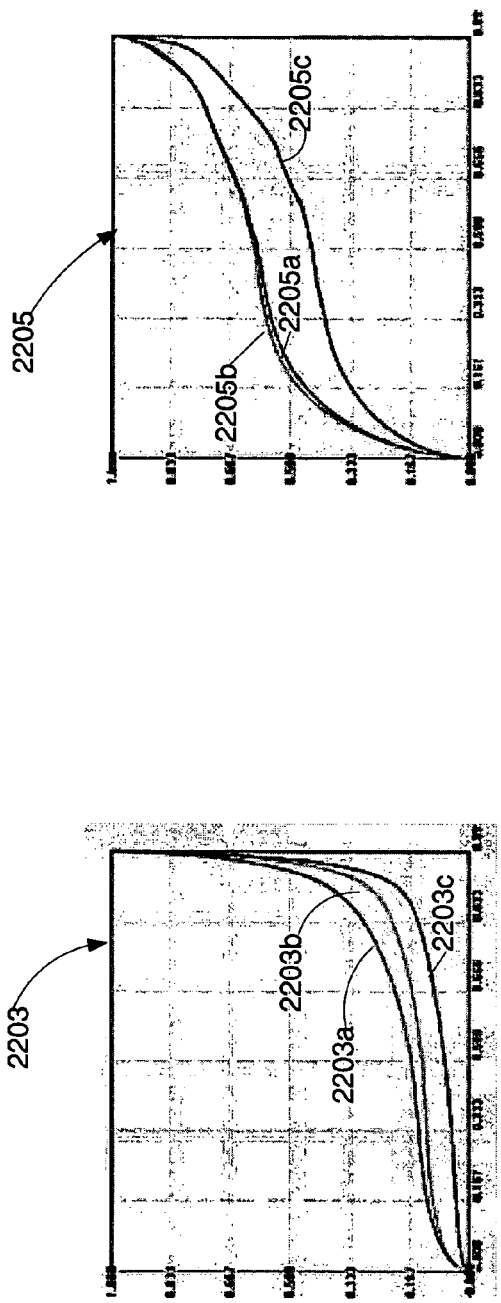

FIG. 22 shows computed inverse response functions 2203 and 2205 with a corresponding doctored image 2201 in accordance with an embodiment of the invention. Inverse functions 2203 (with red component 2203*a*, green component 2203*b*, and blue component 2203*c*) correspond to patches selected only within the image background and correspond to a confidence level of 0.20 (which is positive and is indicative of an undoctored image. However, inverse functions 2205 (with red component 2205*a*, green component 2205*b*, and blue component 2205*c*) correspond to patches selected along a suspected edge (synthesis edge) and correspond to a confidence level of −0.25 and is indicative of a doctored edge. Thus, image 2201 is determined to be doctored.

Figure 23:
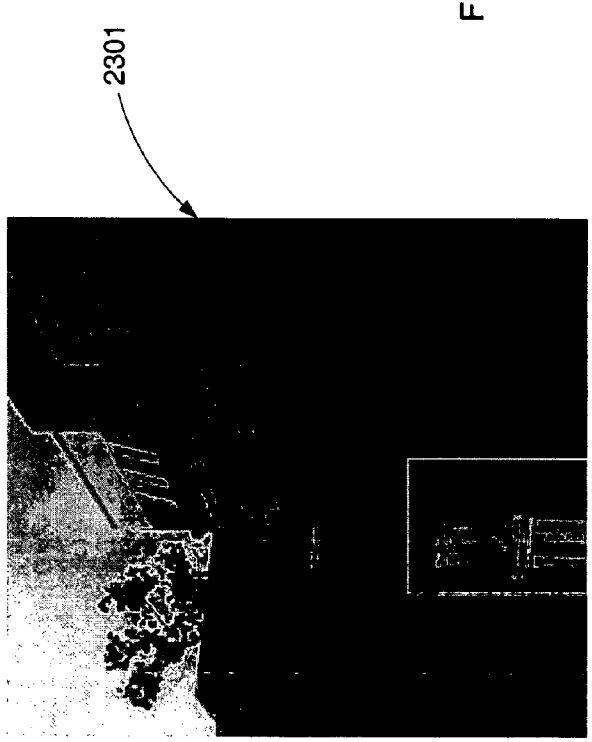
FIG. 23 shows computed inverse response functions with a corresponding doctored image in accordance with an embodiment of the invention.
Figure 23:
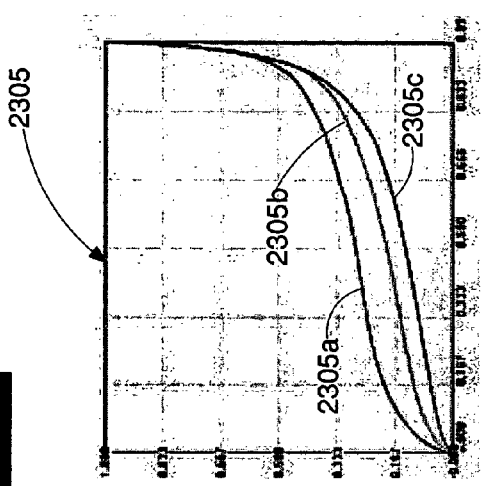
Figure 23:
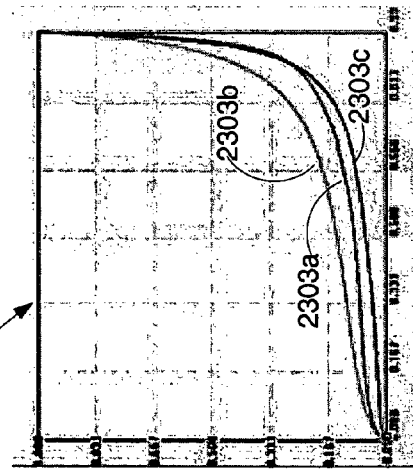

FIG. 23 shows computed inverse response functions 2303 and 2305 with a corresponding doctored image 2301 in accordance with an embodiment of the invention. Inverse functions 2303 (corresponding to red (2303*a*), green (2303*b*), and blue (2303*c*), respectively) correspond to patches selected only within the image background and correspond to a confidence level of 0.48 (which is positive and is indicative of an undoctored image. However, inverse functions 2305 (corresponding to red (2305*a*), green (2305*b*), and blue (2305*c*) components) correspond to patches selected along a suspected edge (synthesis edge) and correspond to a confidence level of −0.03 and is indicative of a doctored edge. Thus, image 2301 is determined to be doctored.

Figure 24:
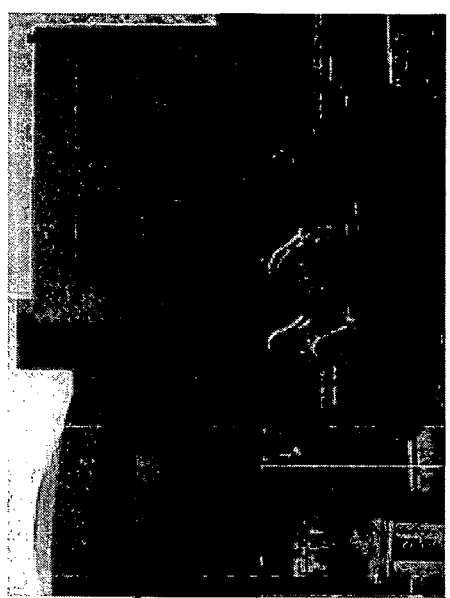
FIG. 24 shows computed inverse response functions with a corresponding doctored image in accordance with an embodiment of the invention.
Figure 24:
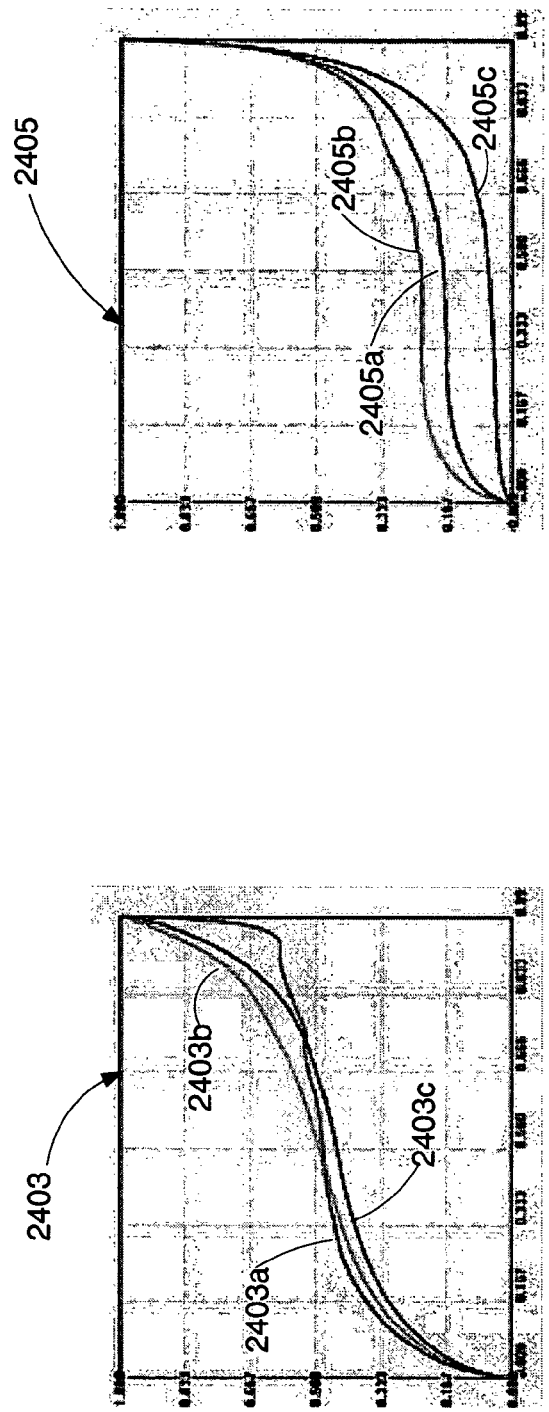

FIG. 24 shows computed inverse response functions 2403 and 2405 with a corresponding doctored image 2401 in accordance with an embodiment of the invention. Inverse functions 2403 (red (2403*a*) component, green (2403*b*) component, and blue (2403*c*) component) correspond to patches selected only within the image background and correspond to a confidence level of 0.74 (which is positive and is indicative of an undoctored image. However, inverse functions 2405 (red (2405*a*), green (2405*b*), and blue (2405*c*) components) correspond to patches selected along a suspected edge (synthesis edge) and correspond to a confidence level of −0.61 and is indicative of a doctored edge. Thus, image 2401 is determined to be doctored.

Figure 25:
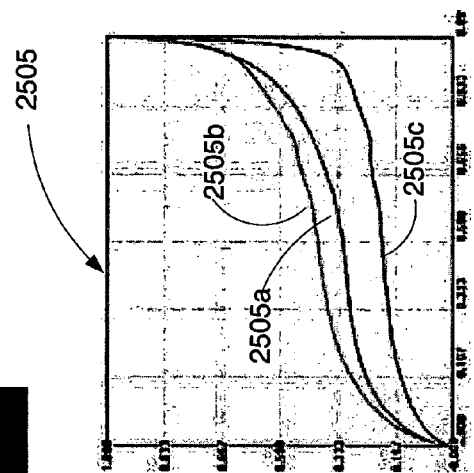
FIG. 25 shows computed inverse response functions with a corresponding doctored image in accordance with an embodiment of the invention.
Figure 25:
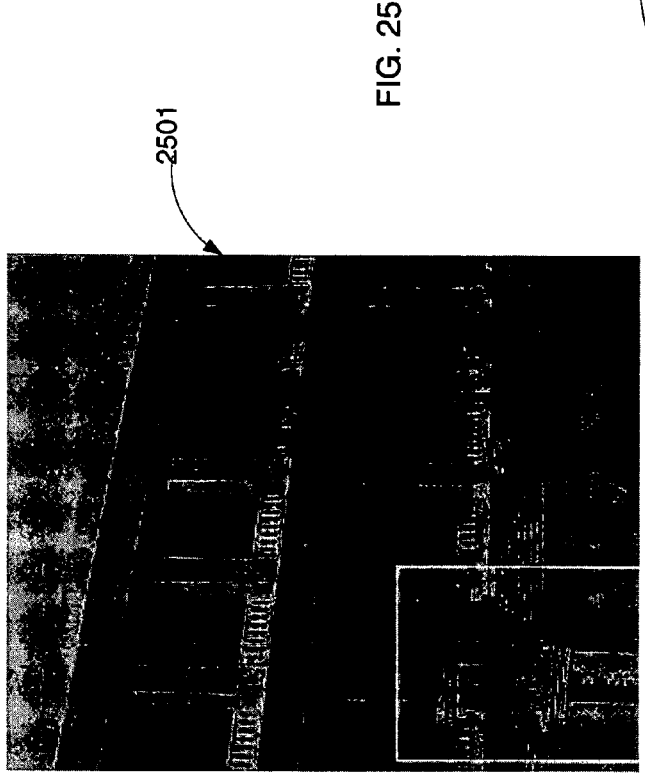
Figure 25:
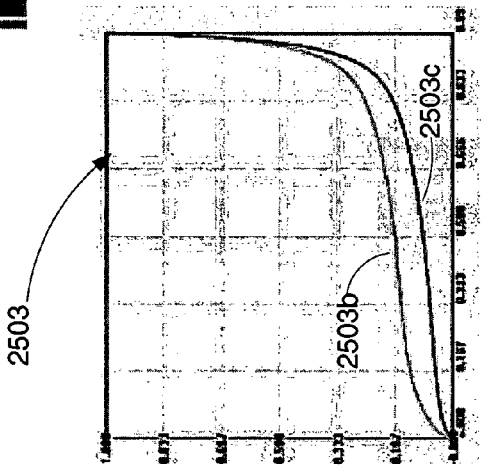

FIG. 25 shows computed inverse response functions 2503 and 2505 with a corresponding doctored image 2501 in accordance with an embodiment of the invention. Inverse functions 2503 (green (2503*b*) and blue (2503*c*) components) correspond to patches selected only within the image background and correspond to a confidence level of 0.74 (which is positive and is indicative of an undoctored image. However, inverse functions 2505 (red (2505*a*), green (2505*b*), and blue (2505*c*) components) correspond to patches selected along a suspected edge (synthesis edge) and correspond to a confidence level of −1.06 and is indicative of a doctored edge. Thus, image 2501 is determined to be doctored.

Figure 26:
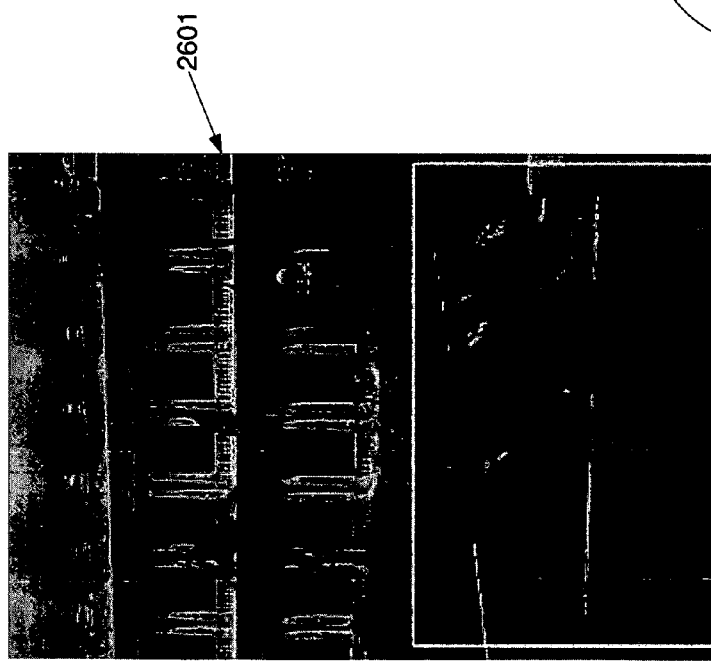
FIG. 26 shows computed inverse response functions with a corresponding doctored image in accordance with an embodiment of the invention.
Figure 26:
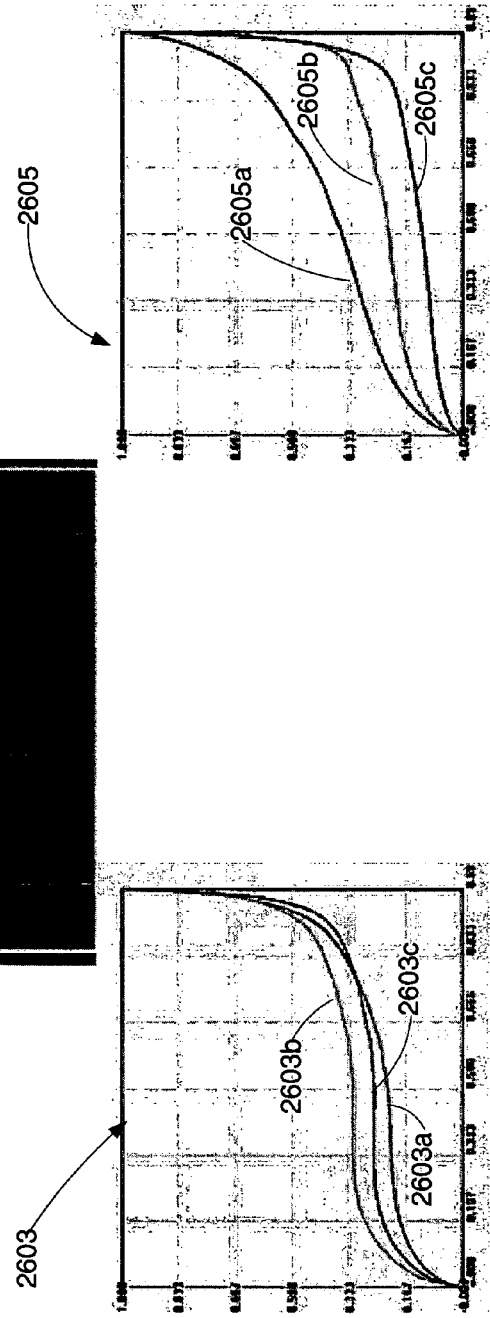

FIG. 26 shows computed inverse response functions 2603 and 2605 with a corresponding doctored image 2601 in accordance with an embodiment of the invention. Inverse functions 2603 (red (2603*a*), green (2603*b*), and blue (2603*c*) components) correspond to patches selected only within the image background and correspond to a confidence level of 0.52 (which is positive and is indicative of an undoctored image. However, inverse functions 2605 (red (2605*a*), green (2605*b*), and blue (2605*c*) components) correspond to patches selected along a suspected edge (synthesis edge) and correspond to a confidence level of −2.04 and is indicative of a doctored edge. Thus, image 2601 is determined to be doctored.

Figure 27:
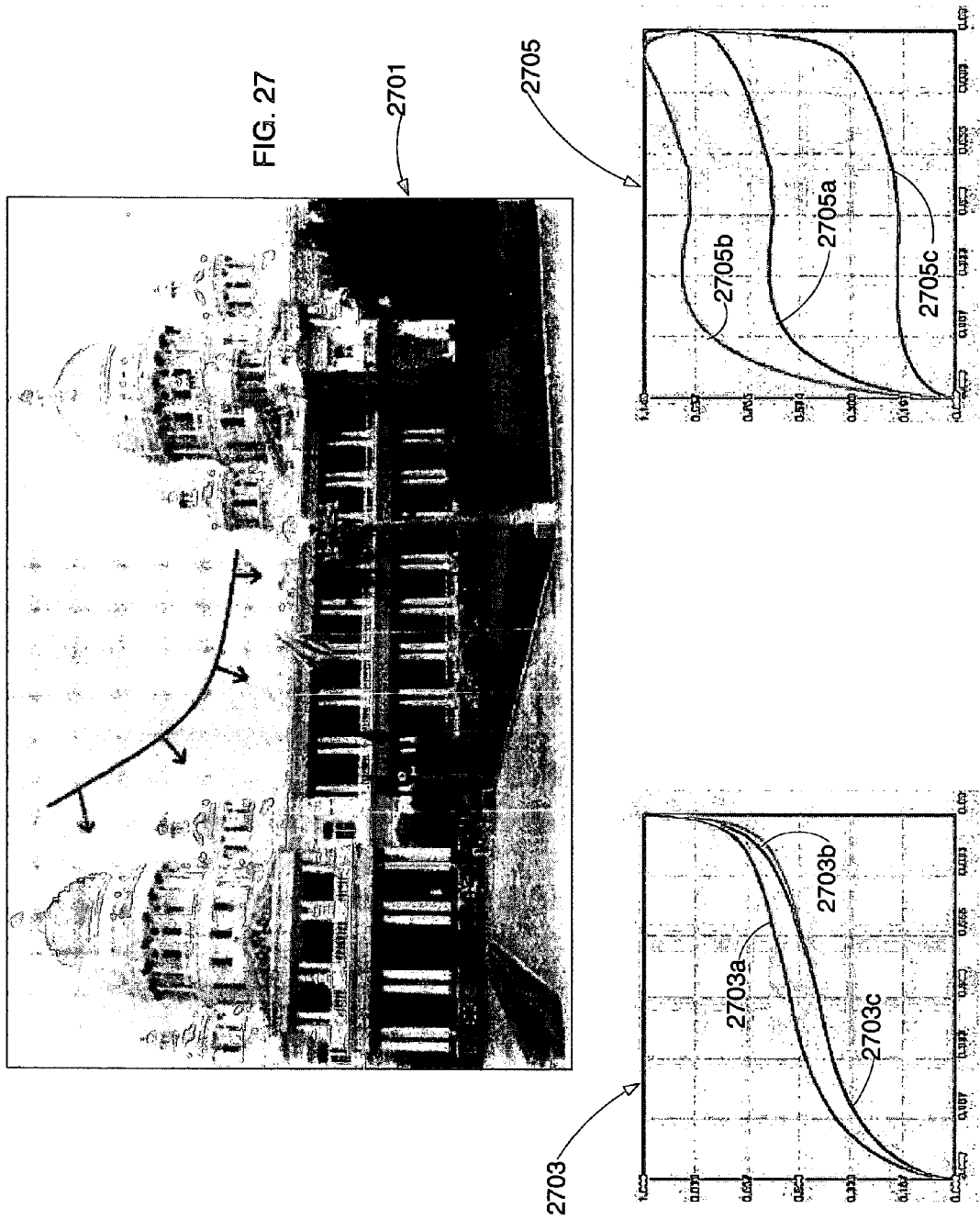
FIG. 27 shows computed inverse response functions with a corresponding doctored image in accordance with an embodiment of the invention.

FIG. 27 shows computed inverse response functions 2703 and 2705 with a corresponding doctored image 2701 in accordance with an embodiment of the invention. Inverse functions 2703 (red (2703*a*), green (2703*b*), and blue (2703*c*) components) correspond to patches selected only within the image background and correspond to a confidence level of 0.71 (which is positive and is indicative of an undoctored image. However, inverse functions 2705 (red (2705*a*), green (2705*b*), and blue (2705*c*) components) correspond to patches selected along a suspected edge (synthesis edge) and correspond to a confidence level of −9.64 and is indicative of a doctored edge. Thus, image 2701 is determined to be doctored.

In the above examples of FIGS. 22-27, when the patches are selected from the background, which is unaltered, the inverse response curves are determined to be normal (corresponding to inverse response functions 2203, 2303, 2403, 2503, 2603, and 2703).

When the patches are selected along the synthesis edge, the inverse response curves are determined to be abnormal (corresponding to inverse response functions 2205, 2305, 2405, 2505, 2605, and 2705). The above examples in FIGS. 22-27 suggest that the abnormality and consistency of response functions is good indicator as to whether a viewed image has been synthesized (doctored) from other images.

While embodiments of the invention can detect whether an image has been doctored, other embodiments of the invention can process a video file or video signal to determine if the video file or signal has been doctored.

Figure 28:
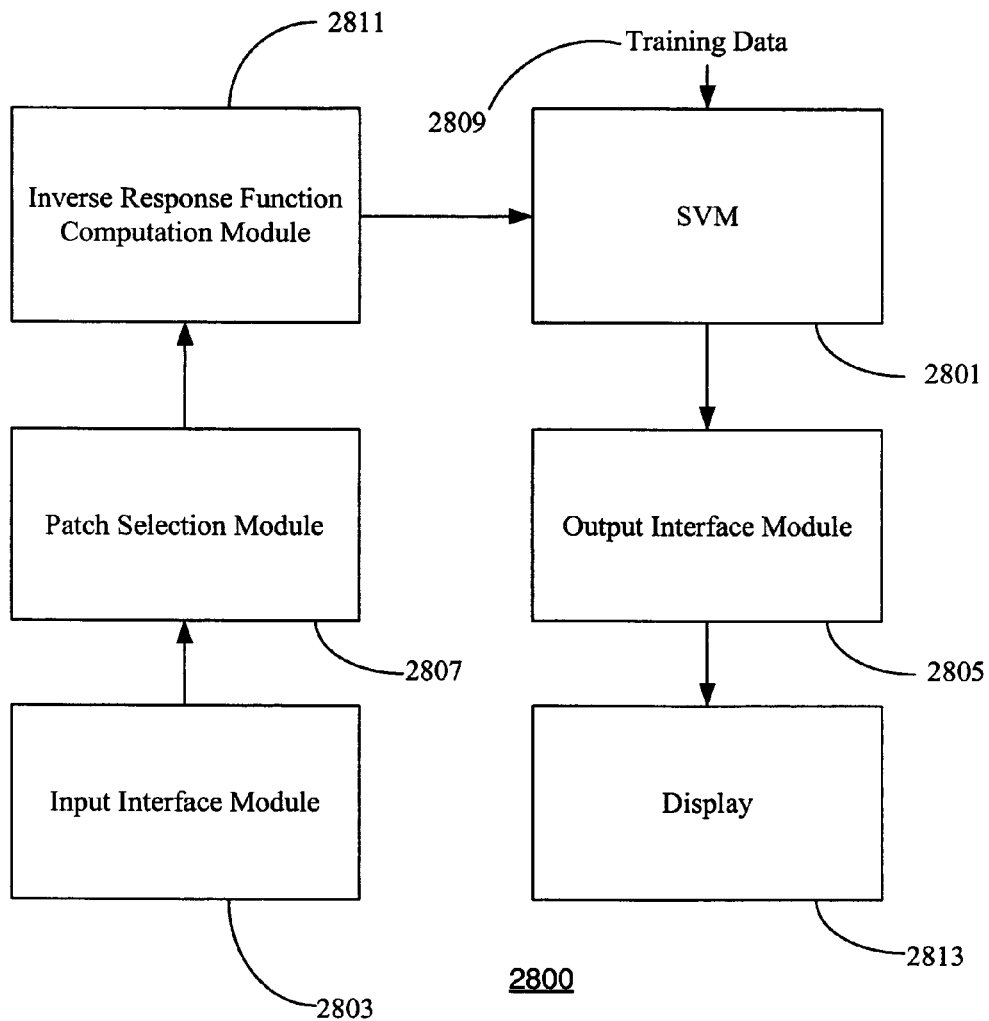
FIG. 28 shows an apparatus for detecting doctored images in accordance with an embodiment of the invention.

FIG. 28 shows apparatus 2800 for detecting doctored images in accordance with an embodiment of the invention. Apparatus 2800 comprises SVM 2801, input interface module 2803, output interface module 2805, patch selection module 2807, inverse response function computation module 2811, and display 2813. SVM 2801 is trained in advance by exemplary inverse response functions (training data 2809) being provided to SVM 2801. Training data includes both normal and abnormal inverse response functions. When SVM 2801 has been trained, then SVM can be utilized to process previously unprocessed data.

Through the input interface module 2803, patches can be selected, either automatically or manually, by the patch selection module 2807. Corresponding inverse response functions are determined from inverse response function computation module 2811 using Equations 1 and 2 as previously discussed. SVM processes each tuple of inverse response functions (corresponding to a set of patches) and determines whether the inverse response functions are normal or abnormal, the associated confidence factors, and whether the inverse response functions are consistent. SVM may provide the results to a user on display 2813 trough output interface module 2805.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A computer-readable medium for determining whether an image is doctored and having computer-executable instructions to perform the steps comprising:
   (a) obtaining a collection of inverse response functions, each member of the collection including a tuple of inverse response functions and corresponding to a corresponding set of patches;
   (b) analyzing each said member of the collection of inverse response functions to determine whether each said member is normal; and
   (c) determining whether the collection of inverse responses is consistent.

2. The computer-readable medium of claim 1, containing further computer-executable instructions for:
   (d) if any member of the collection of inverse response functions is abnormal, classifying the image as being doctored.

3. The computer-readable medium of claim 2, containing further computer-executable instructions for:
   (e) if the collection of inverse functions is inconsistent, classifying the image as being doctored.

4. The computer-readable medium of claim 1, wherein the tuple of each member comprises a red component, a green component, and a blue component.

5. The computer-readable of claim 1, containing further computer-executable instructions for:
   (b)(i) determining a first value of a first feature for each said member; and
   (b)(ii) comparing the first value to a first predetermined threshold.

6. The computer-readable medium of claim 5, containing further computer-executable instructions for:
   (b)(iii) determining a second value of a second feature for each member; and
   (b)(iv) comparing the second value to a second predetermined threshold.

7. The computer-readable medium of claim 6, wherein the first feature ($f_{div}$) is characterized by a closeness of a red component, a green component, and a blue component of the tuple of each said member, and wherein the second feature ($f_{mono}$) is characterized by monotonicity.

8. The computer-readable medium of claim 1, containing further computer-executable instructions for:
   (b)(i) determining values of a first feature ($f_{div}$), a second feature ($f_{mon}$), and a third feature ($f_{fluc}$), wherein the first feature is characterized by a closeness of a red component, a green component, and a blue component of the tuple of each said member, wherein the second feature is characterized by monotonicity, and wherein the third feature is characterized by a number of inflexions; and
   (b)(ii) comparing the values with corresponding predetermined thresholds jointly.

9. The computer-readable medium of claim 1, containing further computer-executable instructions for:
   (d) selecting the corresponding set of patches in the image.

10. The computer-readable medium of claim 9, wherein the corresponding set of patches is selected from a group consisting of an image foreground, an image background, and an image edge.

11. The computer-readable medium of claim 1, containing further computer-executable instructions for:
   (d) recovering each inverse response function from the image to map color components back to irradiance of the image.

12. The computer-readable medium of claim 1, containing further computer-executable instructions for:
   (b)(i) determining a confidence level that each said member is normal.

13. The computer-readable medium of claim 1, containing further computer-executable instructions for:
   (d) training a support vector machine (SVM) to discern characteristics of a doctored image.

14. An apparatus that determines whether an image is doctored, comprising:
   an input device module that obtains input data regarding inverse response functions for a set of patches in the image; and
   a learning machine that analyzes a feature space of the inverse response functions to determine whether the inverse response functions are normal and consistent.

15. The apparatus of claim 14, wherein the learning machine comprises a support vector machine (SVM).

16. The apparatus of claim 14, further comprising:
a patch capturing module that captures a portion of the image and provides corresponding image data to the input interface module.

17. The apparatus of claim 14, wherein the input interface module obtains training inverse response function data, and wherein the learning machine adjusts internal parameters in accordance with the training inverse response function data.

18. The apparatus of claim 14, further comprising:
an inverse response function computation module that recovers the inverse response functions from the input data by mapping color components to irradiance of the image.

19. The apparatus of claim 15, wherein the SVM provides a confidence level for the inverse response functions.

20. A computer-readable medium for determining whether an image is doctored and having computer-executable instructions to perform the steps comprising:
(a) locating a set of patches in the image;
(b) determining a tuple of inverse response functions from the set of patches;
(c) analyzing the tuple of inverse response functions to determine whether the inverse response functions are normal;
(d) locating another set of patches in the image;
(e) in response to (d), repeating steps (b)-(c);
(f) if any tuple of inverse functions is abnormal, classifying the image as being doctored; and
(g) if the inverse response functions are inconsistent, classifying the image as being doctored.

* * * * *